US012669357B2

(12) United States Patent
Umetsu et al.

(10) Patent No.: US 12,669,357 B2
(45) Date of Patent: Jun. 30, 2026

(54) FLOW RATE MEASUREMENT SYSTEM

(71) Applicant: NIPPON STEEL CORPORATION, Tokyo (JP)

(72) Inventors: Kenji Umetsu, Tokyo (JP); Atsushi Sugihashi, Tokyo (JP); Hiroshi Harada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 292 days.

(21) Appl. No.: 18/292,445

(22) PCT Filed: Oct. 29, 2021

(86) PCT No.: PCT/JP2021/040128
§ 371 (c)(1),
(2) Date: Jan. 26, 2024

(87) PCT Pub. No.: WO2023/073955
PCT Pub. Date: May 4, 2023

(65) Prior Publication Data
US 2024/0344857 A1      Oct. 17, 2024

(51) Int. Cl.
G01F 1/58          (2006.01)
B22D 11/18          (2006.01)
(52) U.S. Cl.
CPC .............. G01F 1/58 (2013.01); B22D 11/186 (2013.01)
(58) Field of Classification Search
None
See application file for complete search history.

(56) References Cited

U.S. PATENT DOCUMENTS 3,463,365 A * 8/1969 Dumont-Fillon ...... G01N 35/00
                                                      164/489
5,265,665 A * 11/1993 Fujii .................... B22D 11/115
                                                      164/466
(Continued)

FOREIGN PATENT DOCUMENTS

JP          S46-5910 B1      2/1971
JP          S49-94354 A      9/1974
(Continued)

OTHER PUBLICATIONS

International Search Report with the Written Opinion of the International Searching Authority issued by the Japan Patent Office for corresponding International Patent Application No. PCT/JP2021/040128, mailed on Jan. 11, 2022 with a partial English translation.
(Continued)

*Primary Examiner* — Daniel S Larkin
(74) *Attorney, Agent, or Firm* — Myers Wolin, LLC

(57) ABSTRACT

A flow rate measurement system being a flow rate measurement system that measures a flow rate of molten metal flowing through a hollow portion of a pipe includes an excitation coil that generates a magnetic field so as to intersect with the molten metal flowing through the hollow portion of the pipe; current supply processor circuitry that supplies an alternating exciting current to the excitation coil; a detector that detects a signal based on a magnetic field generated from the excitation coil by an alternating exciting current flowing through the excitation coil or a time variation in the magnetic field; and flow rate deriving processor circuitry that derives the flow rate of the molten metal based on the signal detected by the detector, wherein the pipe is arranged between the excitation coil and the detector, and a magnetic field that reaches the detector across the pipe is generated from the excitation coil.

10 Claims, 22 Drawing Sheets

(56) References Cited

U.S. PATENT DOCUMENTS

| | | | | | |
|---|---|---|---|---|---|
| 5,445,033 A | * | 8/1995 | Savkar | .................... | G01F 1/584 |
| | | | | | 75/331 |
| 2006/0219052 A1 | | 10/2006 | Jalk et al. | | |

FOREIGN PATENT DOCUMENTS

| | | | | | |
|---|---|---|---|---|---|
| JP | S54-33142 B | | 10/1979 | | |
| JP | H08-75515 A | | 3/1996 | | |
| JP | 2000504630 A | * | 4/2000 | .......... | B22D 11/115 |
| JP | 2006-527089 A | | 11/2006 | | |
| JP | 2018-114548 A | | 7/2018 | | |
| JP | 2020169981 A | * | 10/2020 | | |

OTHER PUBLICATIONS

Thomas Gundrum et al., "Contactless Inductive Bubble Detection in a Liquid Metal Flow", Sensors, Jan. 6, 2016, 16, 63, pp. 1-11; doi: 10.3390/s16010063 ; MDPI, Basel Switzerland.

* cited by examiner

F I G. 1
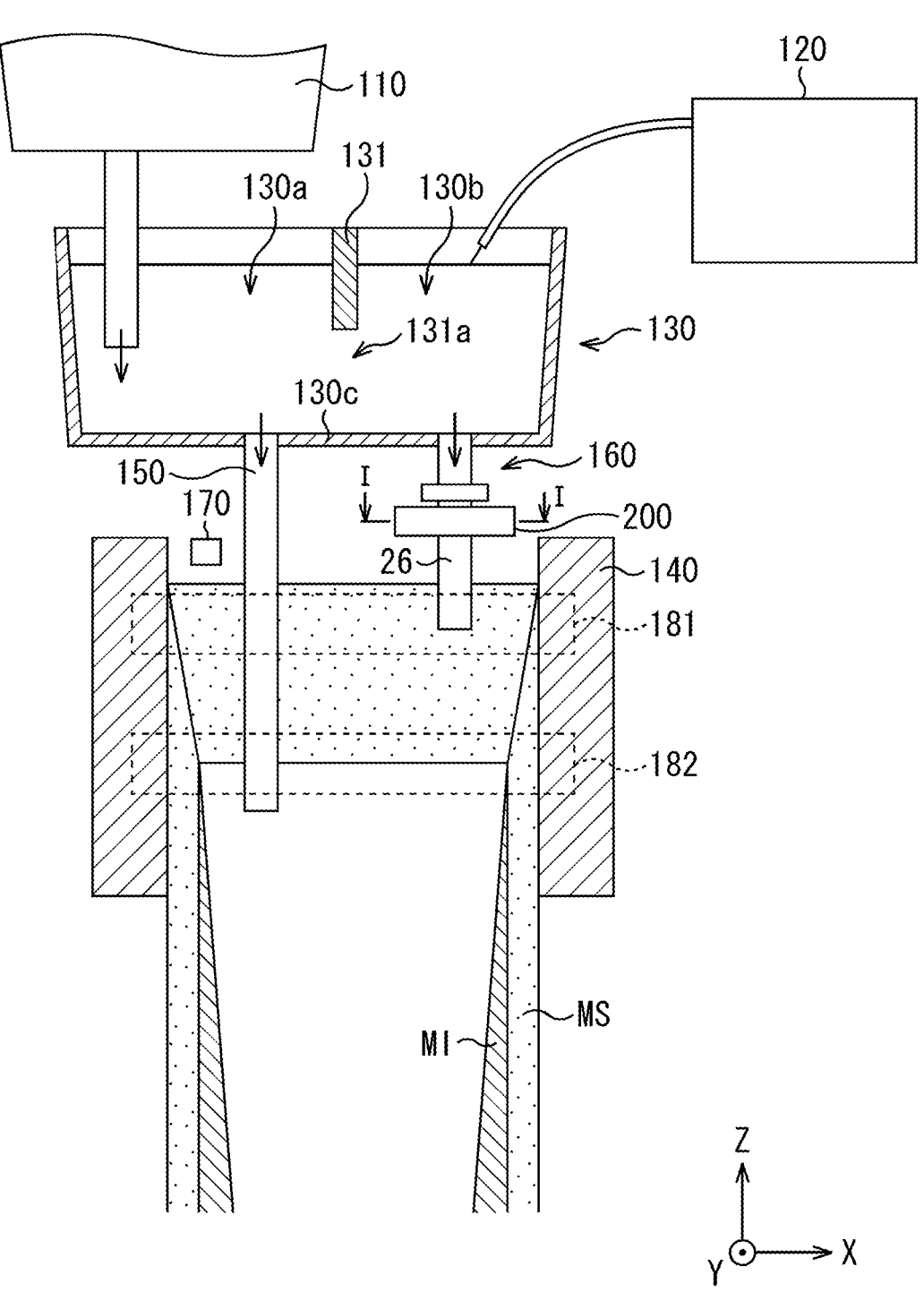

F I G. 2
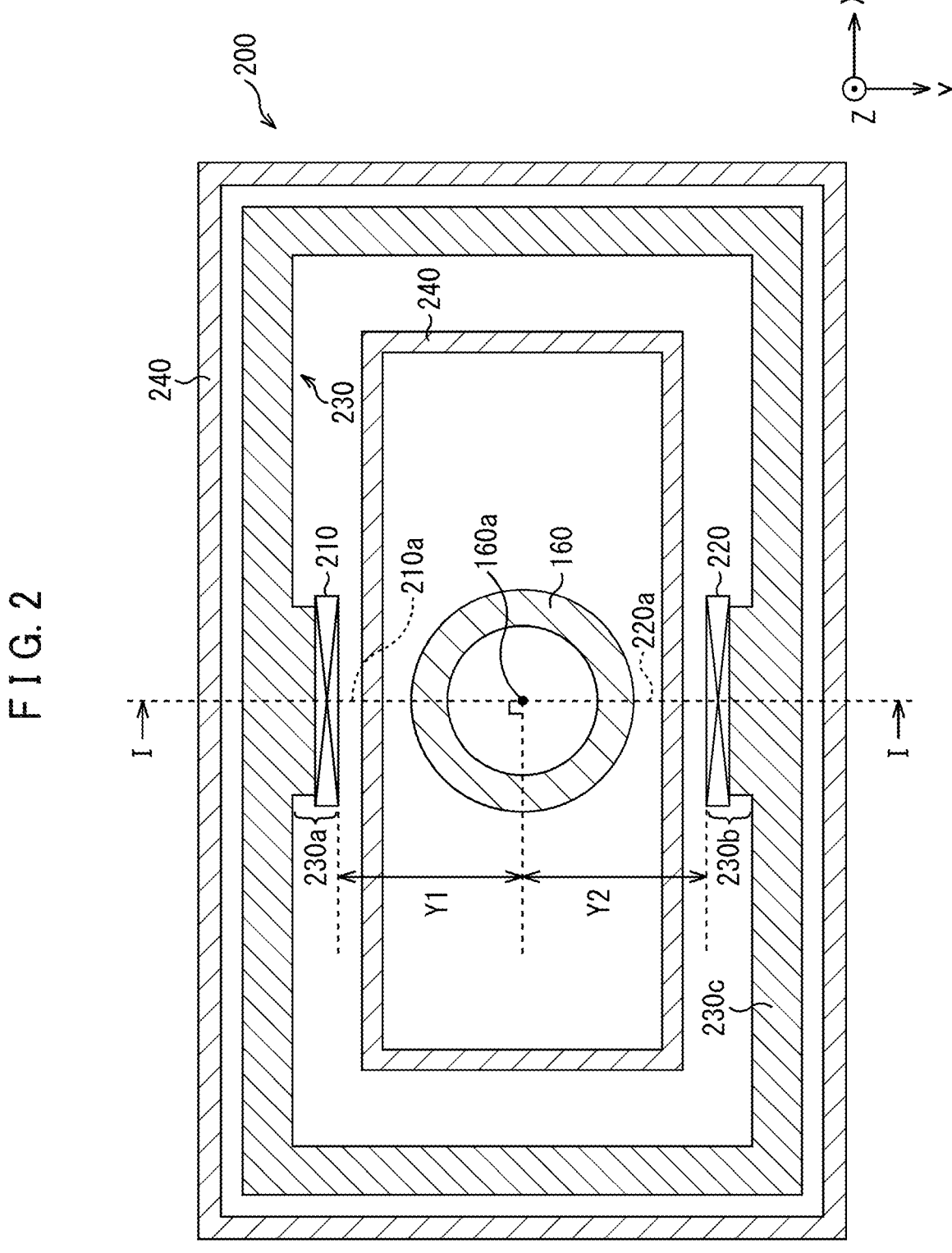

F I G. 3
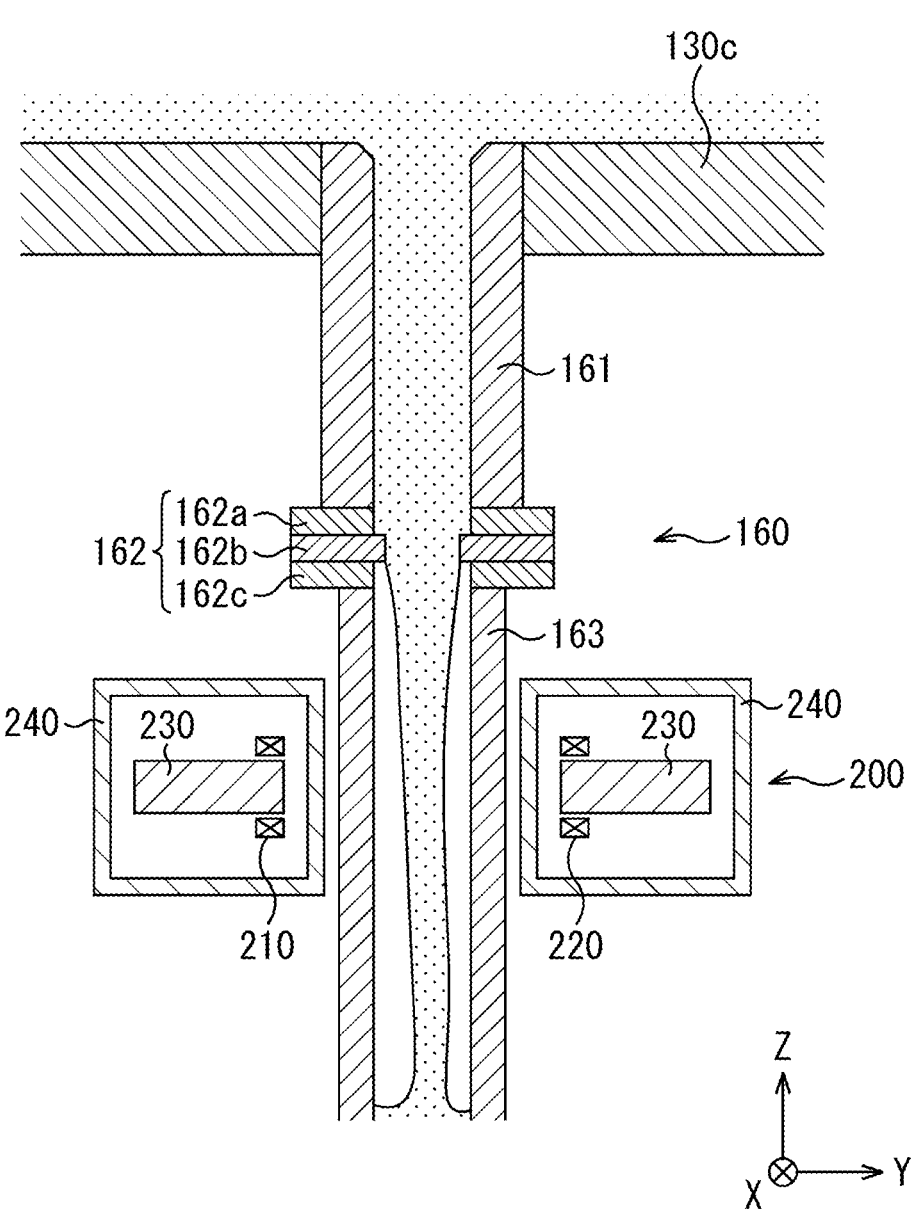

FIG. 4

F I G. 5A
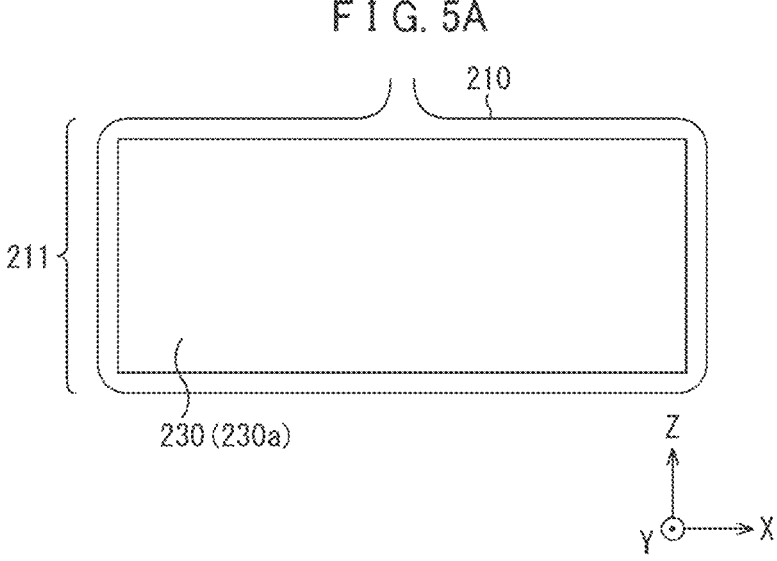
F I G. 5B

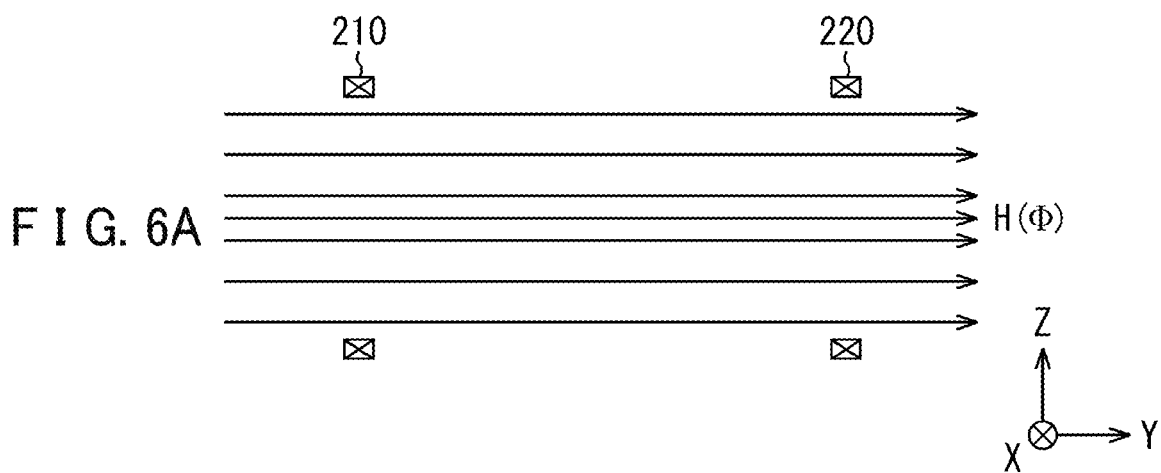
F I G. 6A
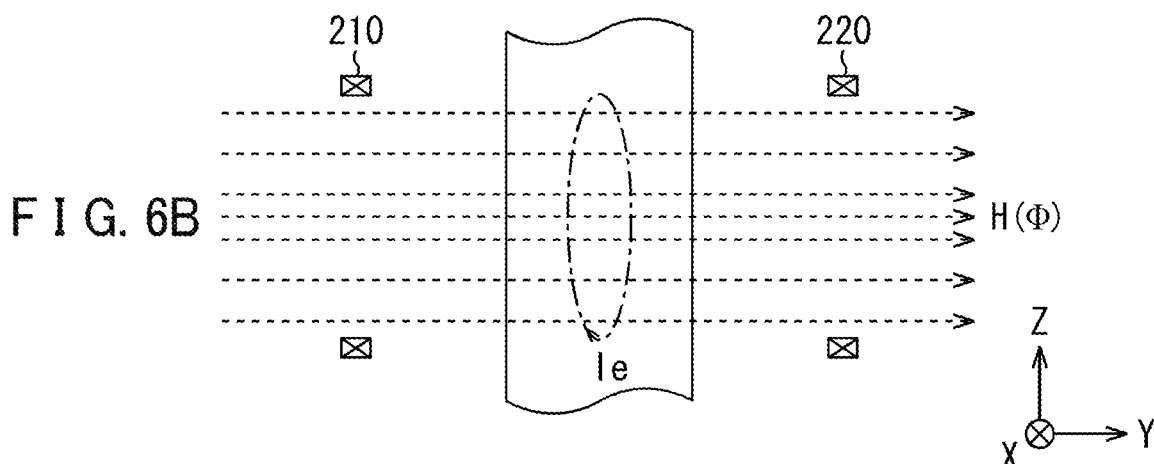
F I G. 6B
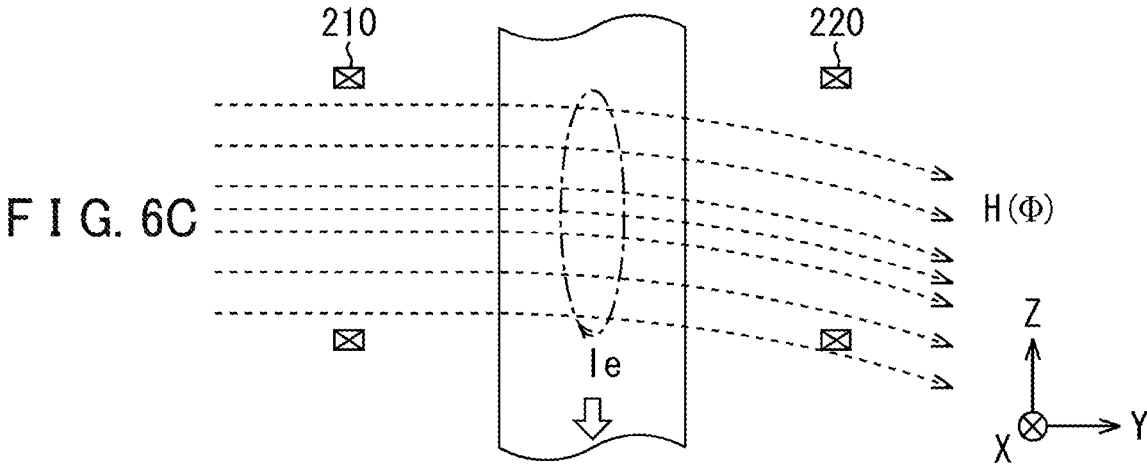
F I G. 6C

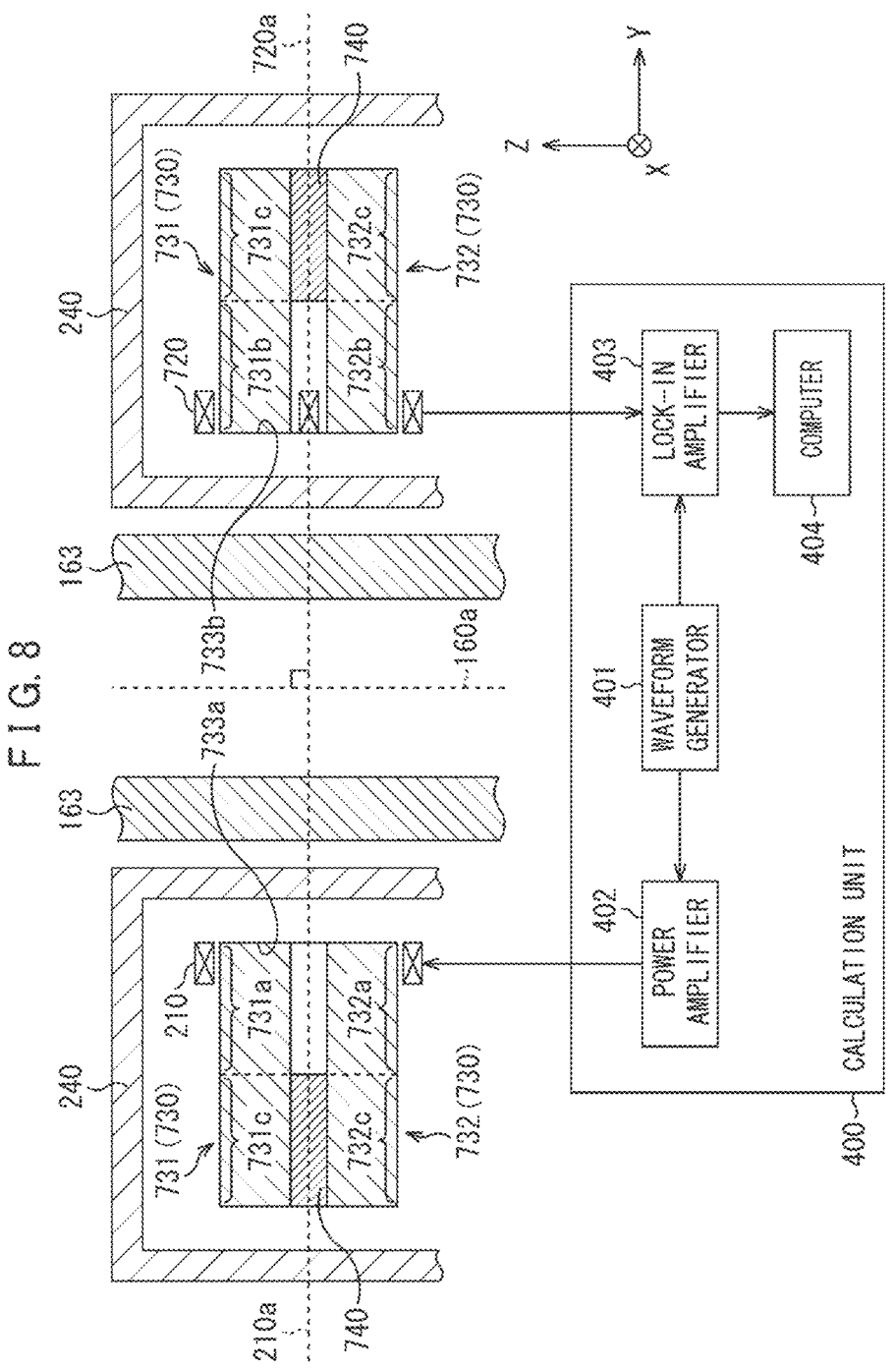
F I G. 8

F I G. 9A
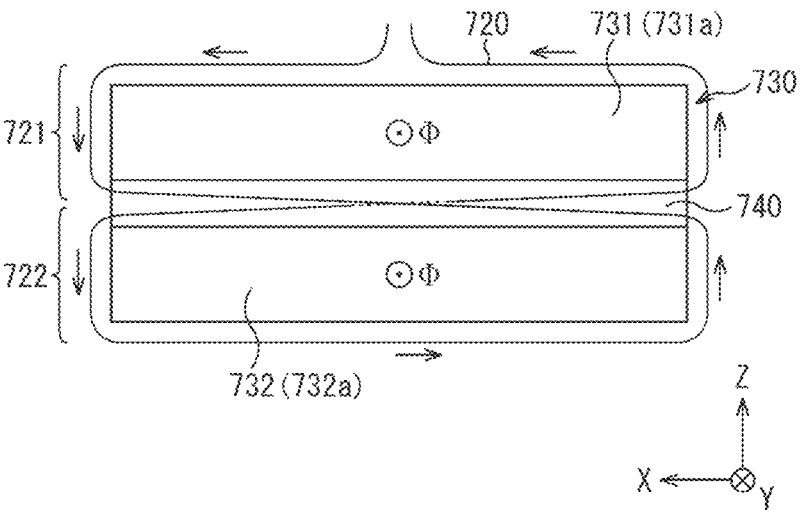
F I G. 9B

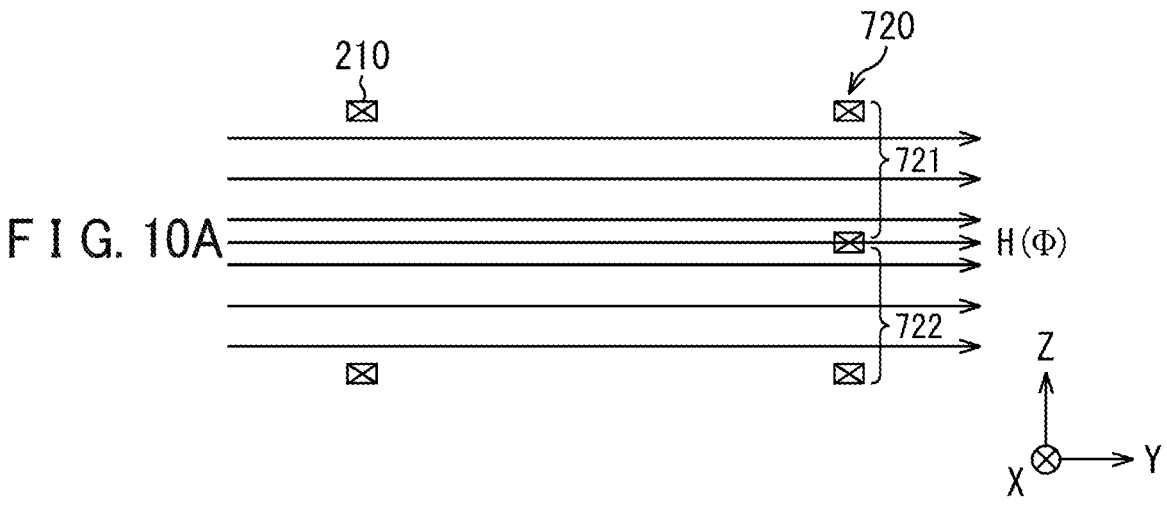
F I G. 10A
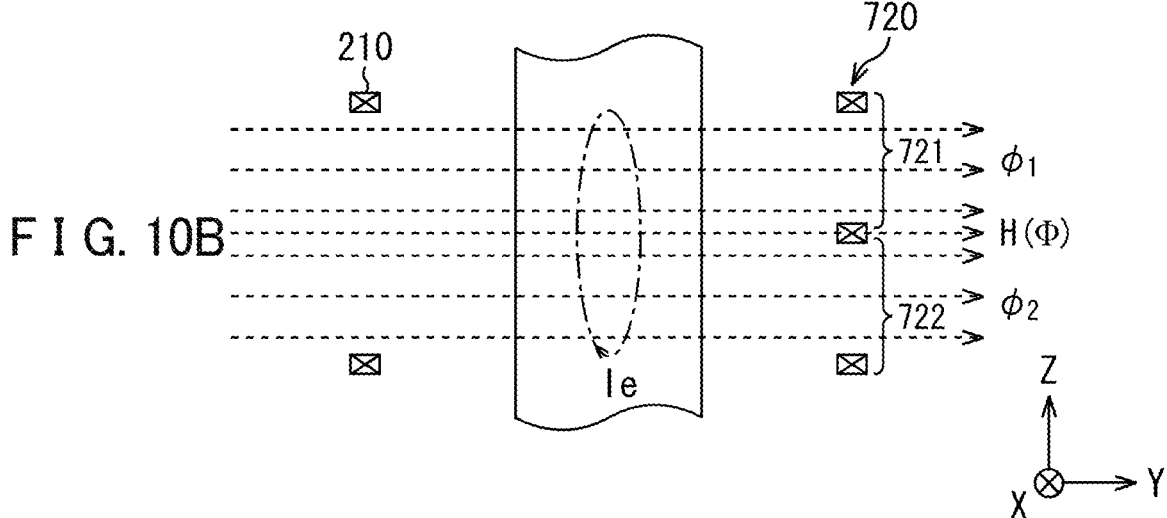
F I G. 10B
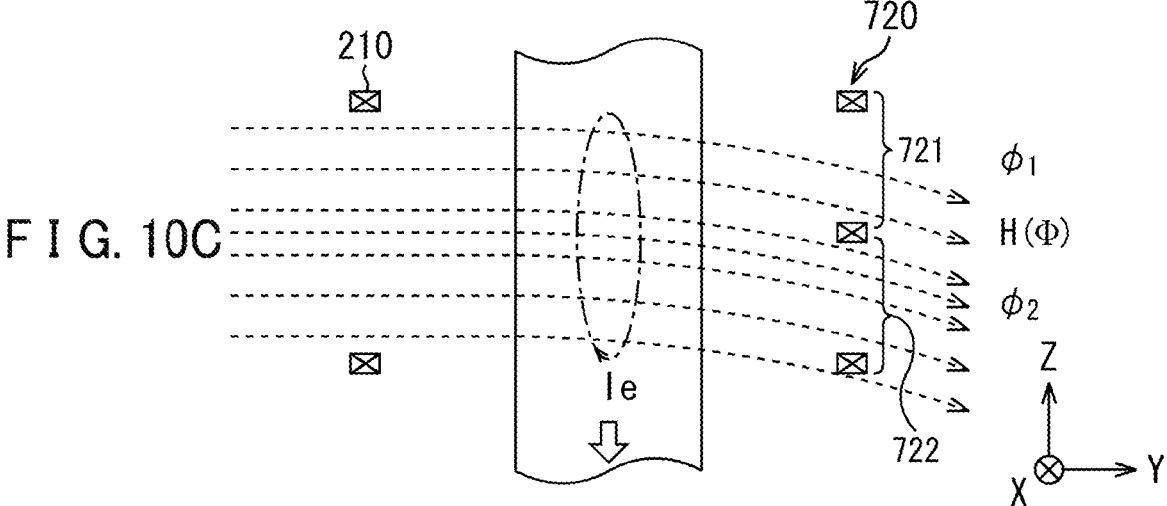
F I G. 10C

F I G. 11
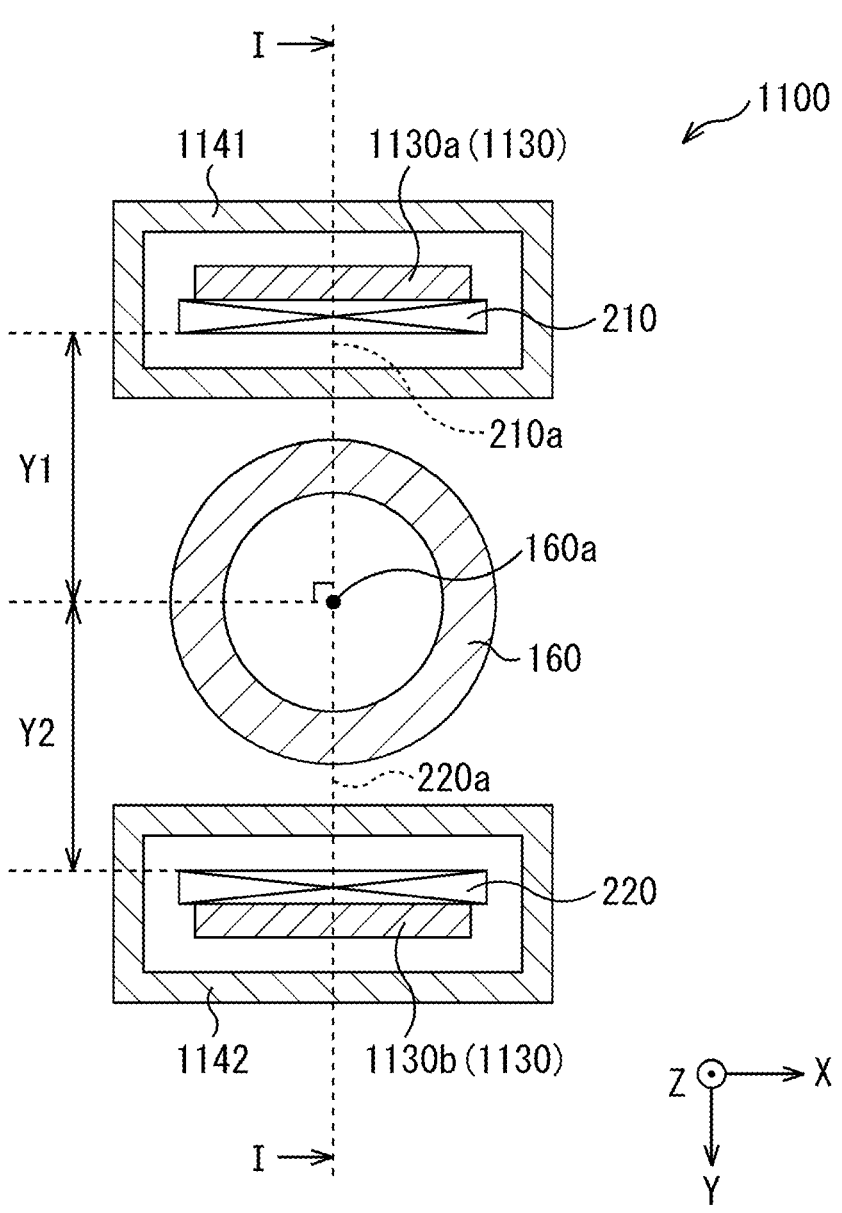

F I G. 12
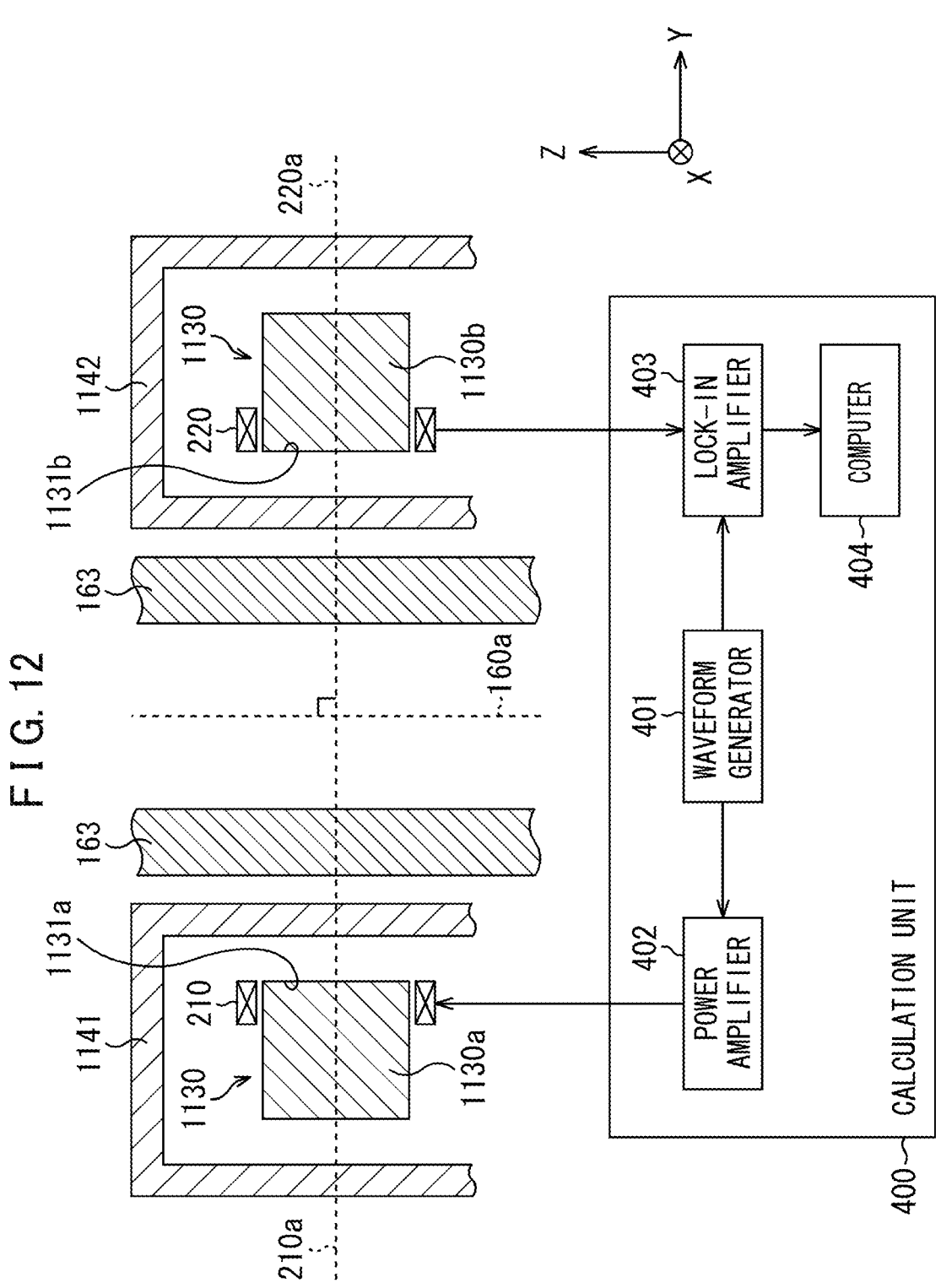

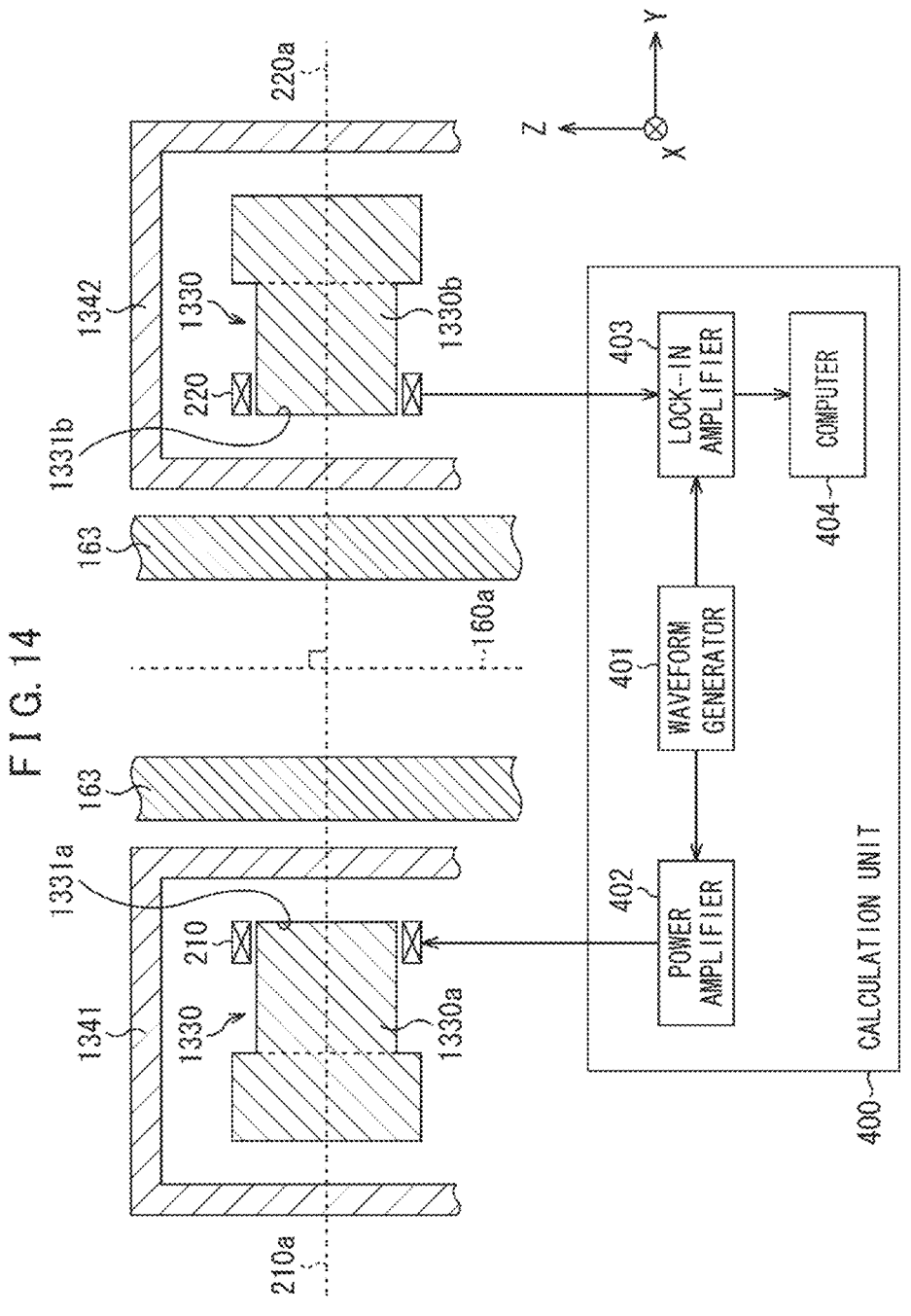
F I G. 14

F I G. 15
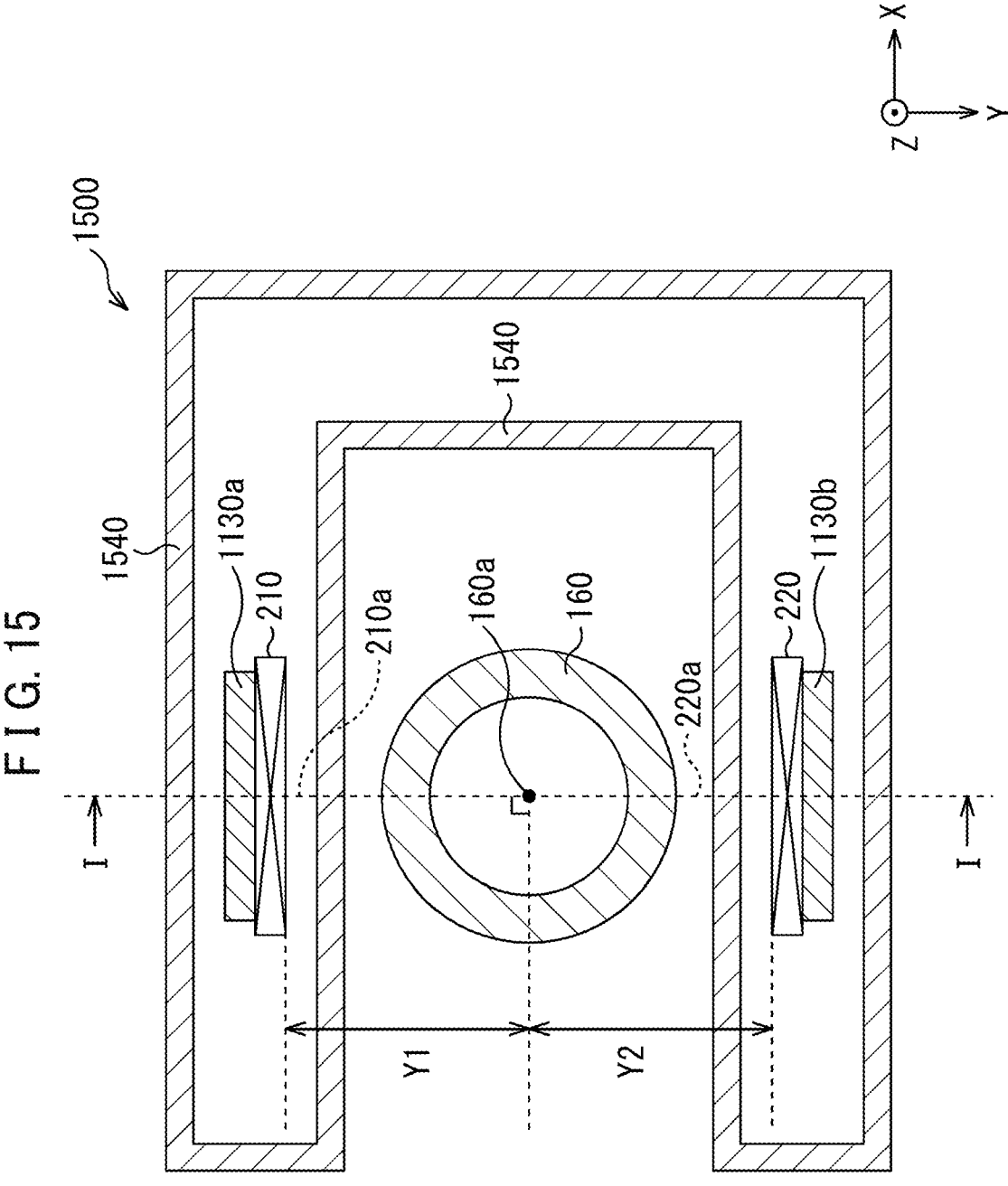

F I G. 16
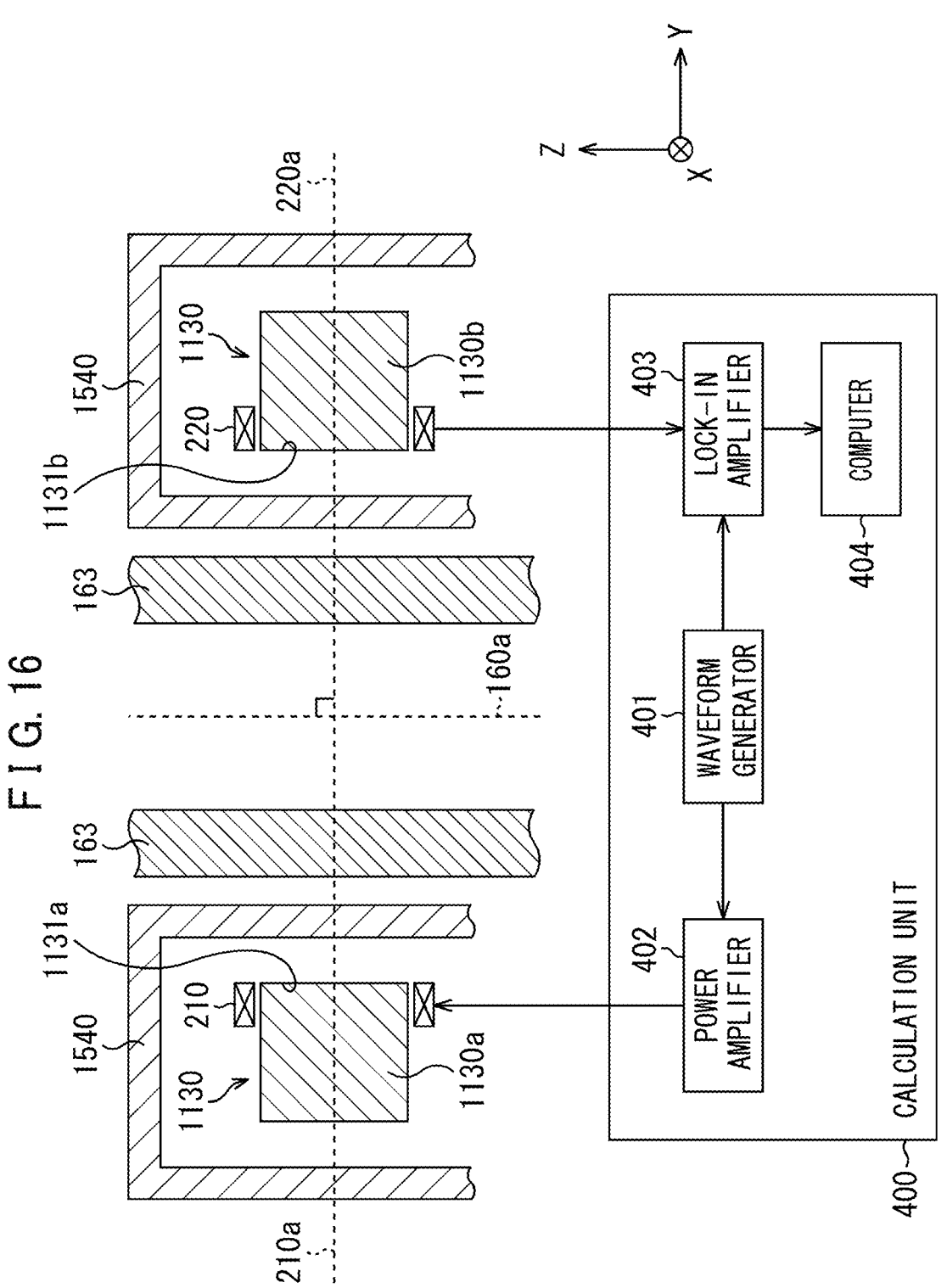

F I G. 17
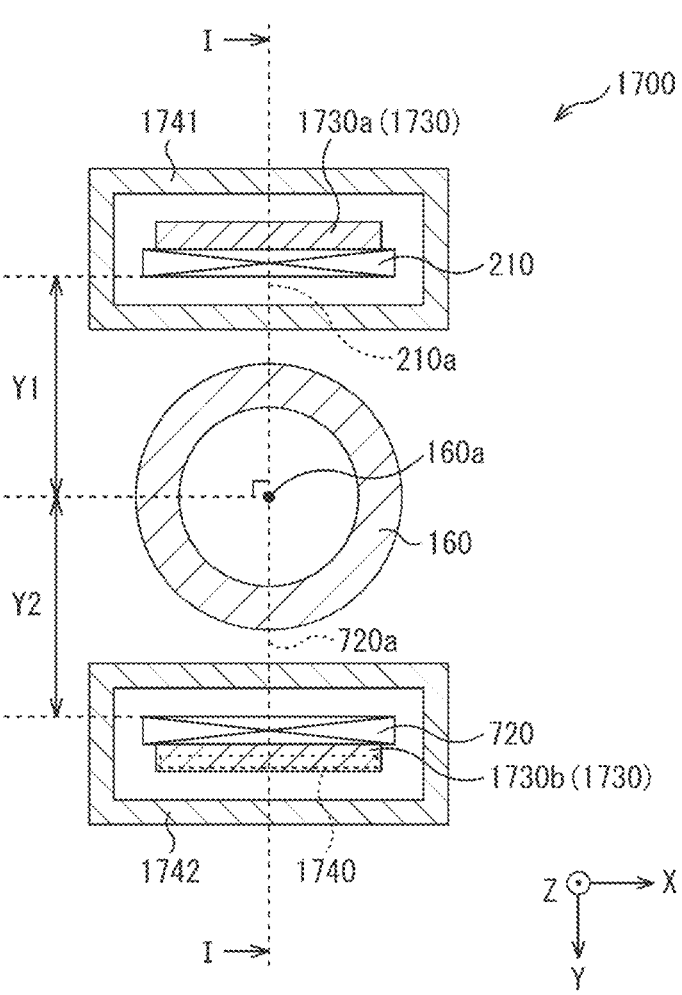

F I G. 18
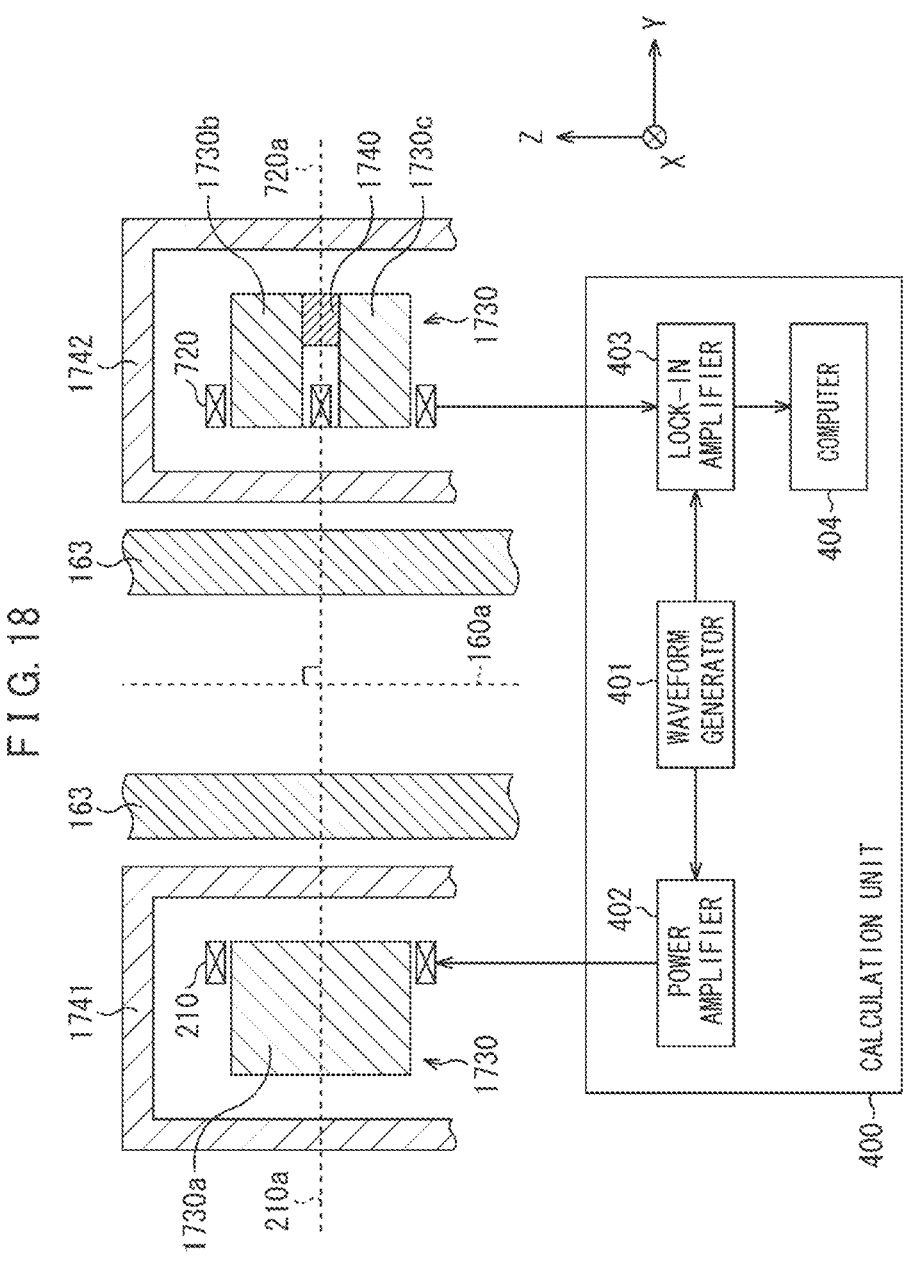

F I G. 19A

F I G. 19B

F I G. 20
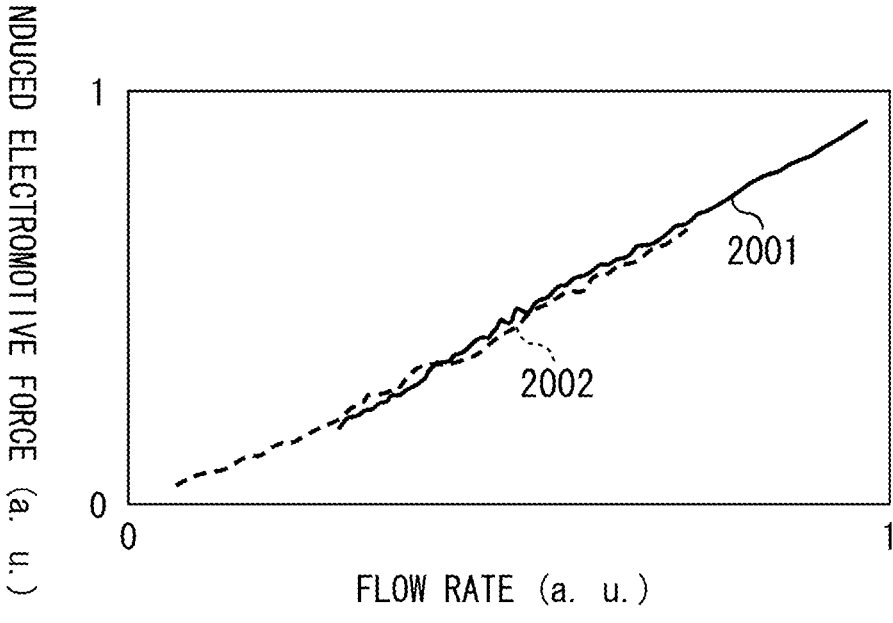

F I G. 21A
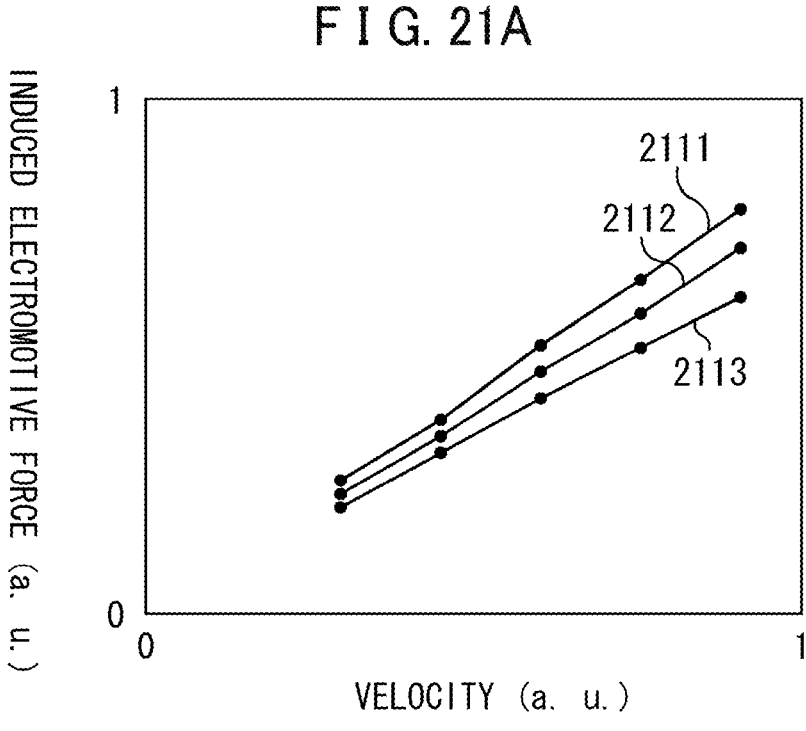
F I G. 21B

F I G. 22
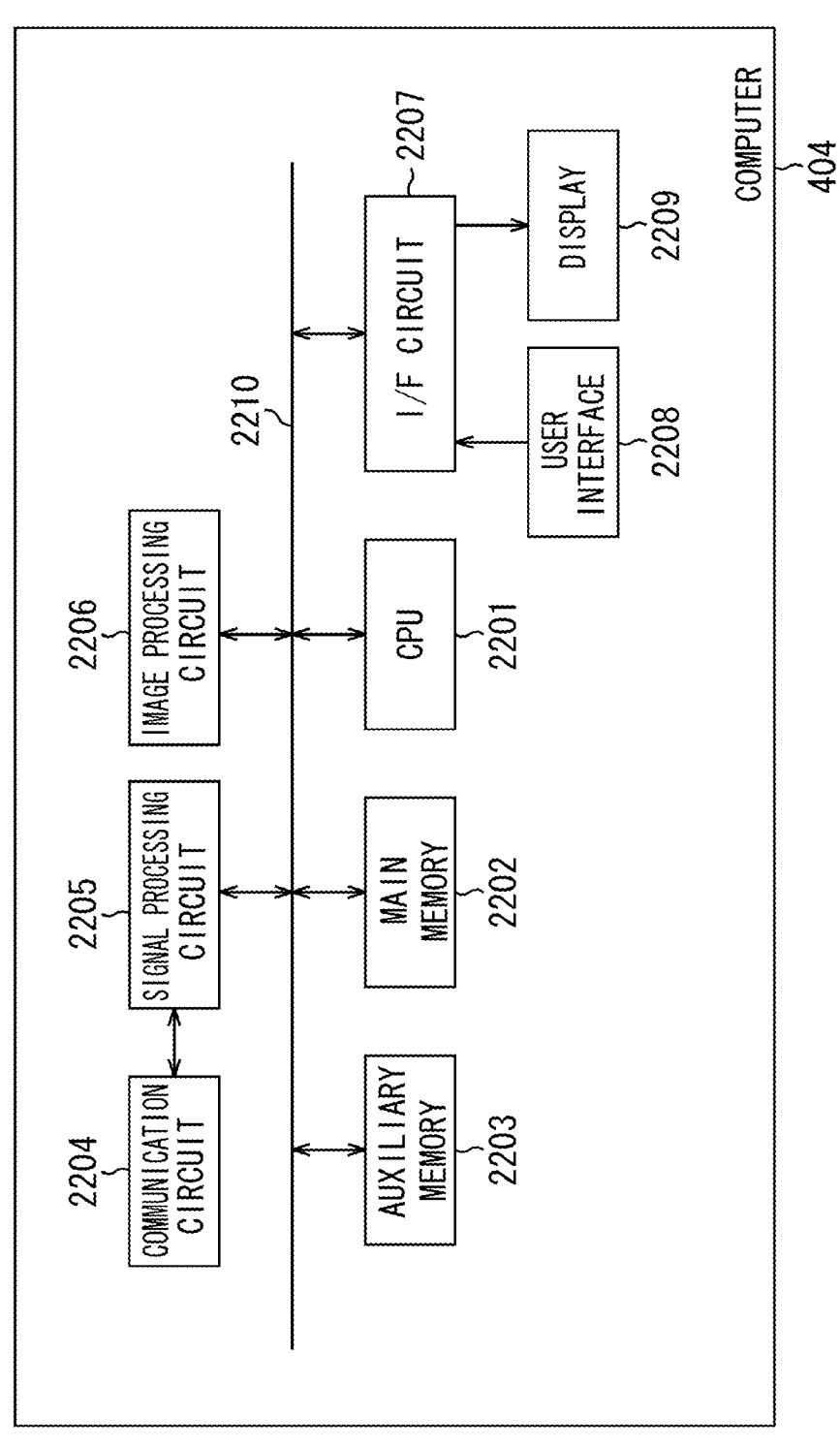

FLOW RATE MEASUREMENT SYSTEM

CROSS-REFERENCE TO RELATED APPLICATION

This application is a National Phase under 35 U.S.C. 371 of PCT/JP2021/040128, filed on Oct. 29, 2021, and designated the U.S. The contents of which are wholly incorporated herein by reference.

TECHNICAL FIELD

The present disclosure relates to a flow rate measurement system, and is particularly suitable for measuring the flow rate of molten metal.

BACKGROUND ART

As a method of measuring the flow rate of molten metal, there has been a method of directly or indirectly measuring the flow rate of molten metal, as has been described in Patent Literature 1. In Patent Literature 1, a transmitting coil and a receiving coil are arranged at positions opposite to each other with a shroud provided therebetween, the shroud through which molten metal passes from a ladle to a tundish. A magnetic field is generated along the flowing direction of the molten metal from the transmitting coil arranged in this manner. The magnetic field generated along the flowing direction of the molten metal from the transmitting coil is excited by the molten metal in the shroud, which generates a magnetic field from the molten metal along the flowing direction of the molten metal. The magnetic field generated along the flowing direction of the molten metal from the molten metal in this manner is detected by the receiving coil. The presence of slag in the shroud is detected by comparing an induced voltage generated at the receiving coil in response to the detected magnetic field over a defined voltage range. In Patent Literature 1, the voltage range to be used in detecting the presence of slag in the shroud in this manner is set according to the flow rate of molten metal, which is separately measured directly or indirectly.

As has been described in Patent Literature 1, there has been a method of directly or indirectly measuring the flow rate of molten metal as a method of measuring the flow rate of molten metal. However, the surroundings of molten metal are at high temperatures, and thus, a technique for measuring the flow rate of molten metal in a non-contact manner is desired. Patent Literature 1 has described that the teeming rate in a tundish can be measured to calculate the flow rate of molten metal from the measured teeming rate. However, a specific method for calculating the flow rate of molten metal has not been explained.

As a method of measuring the flow rate of molten metal in a non-contact manner, Patent Literature 2 has disclosed the technique for measuring the flow rate of molten steel in an immersion nozzle that supplies molten steel into a mold from a tundish in continuous casting. In Patent Literature 2, an excitation coil is used to excite an alternating magnetic field that intersects with a molten steel flow in an upper nozzle located further above a sliding nozzle located above the immersion nozzle. Then, a magnetic field in a direction parallel to the flowing direction of the molten steel flow is detected using a detection coil. Then, the flow rate of the molten steel flow is derived based on the magnetic field in the direction parallel to the flowing direction of the molten steel flow. Further, in Patent Literature 2, the detection coil is arranged between the excitation coil and the upper nozzle.

CITATION LIST

Patent Literature

Patent Literature 1: Japanese Translation of PCT International Application Publication No. 2006-527089
Patent Literature 2: Japanese Laid-open Patent Publication No. 2018-114548

SUMMARY

Technical Problem

However, the technique described in Patent Literature 2 needs to arrange the detection coil between the excitation coil and the upper nozzle. Therefore, when the excitation coil and the detection coil are arranged at the positions apart from the upper nozzle, the signal level to be detected by the detection coil significantly decreases. Further, in the technique described in Patent Literature 2, the excitation coil and the detection coil differ in orientation by 90°, and the detection coil faces in a direction parallel to the flowing direction of the molten steel flow. Therefore, the signal to be detected by the detection coil is easily affected by noise. From the above, the technique described in Patent Literature 2 fails to accurately measure the flow rate of molten metal. Incidentally, the noise mentioned here is, for example, electromagnetic noise excluding magnetic fields and electrical signals generated by the excitation coil and the detection coil. Examples of this electromagnetic noise include electromagnetic noise generated around the excitation coil and the detection coil and electromagnetic noise generated by a device, computer, or the like that performs signal processing. Further, in the technique described in Patent Literature 2, the magnetic field generated by the induced current flowing in the molten steel by excitation of a magnetic field perpendicular to the molten steel flow is detected by the detection coil. Therefore, as described in Patent Literature 2 as well, when the molten steel flow is a non-filling flow, the measurement accuracy is insufficient. The non-filling flow refers to the flow of molten steel that falls discretely inside a pipe without filling the space within the pipe. On the other hand, a filling flow is the flow of molten steel that falls inside a pipe while filling the space within the pipe. Therefore, the flow rate of molten steel can only be measured in the region of the upper nozzle where the molten steel flow is considered to be a filling flow.

The present disclosure has been made in consideration of the above-described problems, and an object thereof is to enable non-contact and highly accurate measurement of the flow rate of molten metal flowing through a hollow portion in a pipe.

Solution to Problem

The flow rate measurement system of the present disclosure is a flow rate measurement system that measures a flow rate of molten metal flowing through a hollow portion of a pipe, the flow rate measurement system including: an excitation coil that generates a magnetic field so as to intersect with the molten metal flowing through the hollow portion of the pipe; a current supply device that supplies an alternating exciting current to the excitation coil; a detecting device that detects a signal based on a magnetic field generated from the excitation coil by an alternating exciting current flowing through the excitation coil or a time variation in the magnetic field; and a flow rate deriving device that derives the flow rate of the molten metal based on the signal detected by the detecting device, in which the pipe is arranged between the excitation coil and the detecting device, and a magnetic field that reaches the detecting device across the pipe is generated from the excitation coil.

BRIEF DESCRIPTION OF DRAWINGS

FIG. 1 is a view illustrating one example of a continuous casting facility.

FIG. 2 is a view illustrating one example of a configuration of a flow rate measurement system in a first embodiment.

FIG. 3 is a view illustrating one example of the outline of arrangement of the flow rate measurement system.

FIG. 4 is a view illustrating one example of details of the arrangement of the flow rate measurement system in the first embodiment.

FIG. 5A is a view conceptually illustrating one example of an excitation coil in the first embodiment.

FIG. 5B is a view conceptually illustrating one example of a detection coil in the first embodiment.

FIG. 6A is a view conceptually explaining one example of the measurement principle of a flow rate measurement part in the first embodiment, and is a view explaining a magnetic field (magnetic flux) when molten steel is not present.

FIG. 6B is a view conceptually explaining one example of the measurement principle of the flow rate measurement part in the first embodiment, and is a view explaining a magnetic field (magnetic flux) when molten steel whose flow velocity is 0 (zero) is present.

FIG. 6C is a view conceptually explaining one example of the measurement principle of the flow rate measurement part in the first embodiment, and is a view explaining a magnetic field (magnetic flux) when molten steel flowing in a casting progress direction is present.

FIG. 8 is a view illustrating one example of details of arrangement of the flow rate measurement system in the second embodiment.

FIG. 9A is a view conceptually illustrating one example of an excitation coil in the second embodiment.

FIG. 9B is a view conceptually illustrating one example of a detection coil in the second embodiment.

FIG. 10A is a view conceptually explaining one example of the measurement principle of a flow rate measurement part in the second embodiment, and is a view explaining a magnetic field (magnetic flux) when molten steel is not present.

FIG. 10B is a view conceptually explaining one example of the measurement principle of the flow rate measurement part in the second embodiment, and is a view explaining a magnetic field (magnetic flux) when molten steel whose flow velocity is 0 (zero) is present.

FIG. 10C is a view conceptually explaining one example of the measurement principle of the flow rate measurement part in the second embodiment, and is a view explaining a magnetic field (magnetic flux) when molten steel flowing in the casting progress direction is present.

FIG. 11 is a view illustrating one example of a configuration of a flow rate measurement system in a third embodiment.

FIG. 12 is a view illustrating one example of details of arrangement of the flow rate measurement system in the third embodiment.

FIG. 14 is a view illustrating details of arrangement of the flow rate measurement system in the first modified example of the third embodiment.

FIG. 15 is a view illustrating a configuration of a flow rate measurement system in a second modified example of the third embodiment.

FIG. 16 is a view illustrating details of arrangement of the flow rate measurement system in the second modified example of the third embodiment.

FIG. 17 is a view illustrating one example of a configuration of a flow rate measurement system in a fourth embodiment.

FIG. 18 is a view illustrating one example of details of arrangement of the flow rate measurement system in the fourth embodiment.

FIG. 19A is a view conceptually illustrating one example of an excitation coil in the fourth embodiment.

FIG. 19B is a view conceptually illustrating one example of a detection coil in the fourth embodiment.

FIG. 20 is a view illustrating one example of the relationship between a flow rate of molten steel and an induced electromotive force.

FIG. 21A is a view illustrating one example of the relationship between a velocity and an induced electromotive force when the method described in Patent Literature 2 is used.

FIG. 21B is a view illustrating one example of the relationship between a velocity and an induced electromotive force when the method in the second embodiment is used.

FIG. 22 is a diagram illustrating one example of a configuration of hardware of a computer.

DESCRIPTION OF EMBODIMENTS

Figure 7:
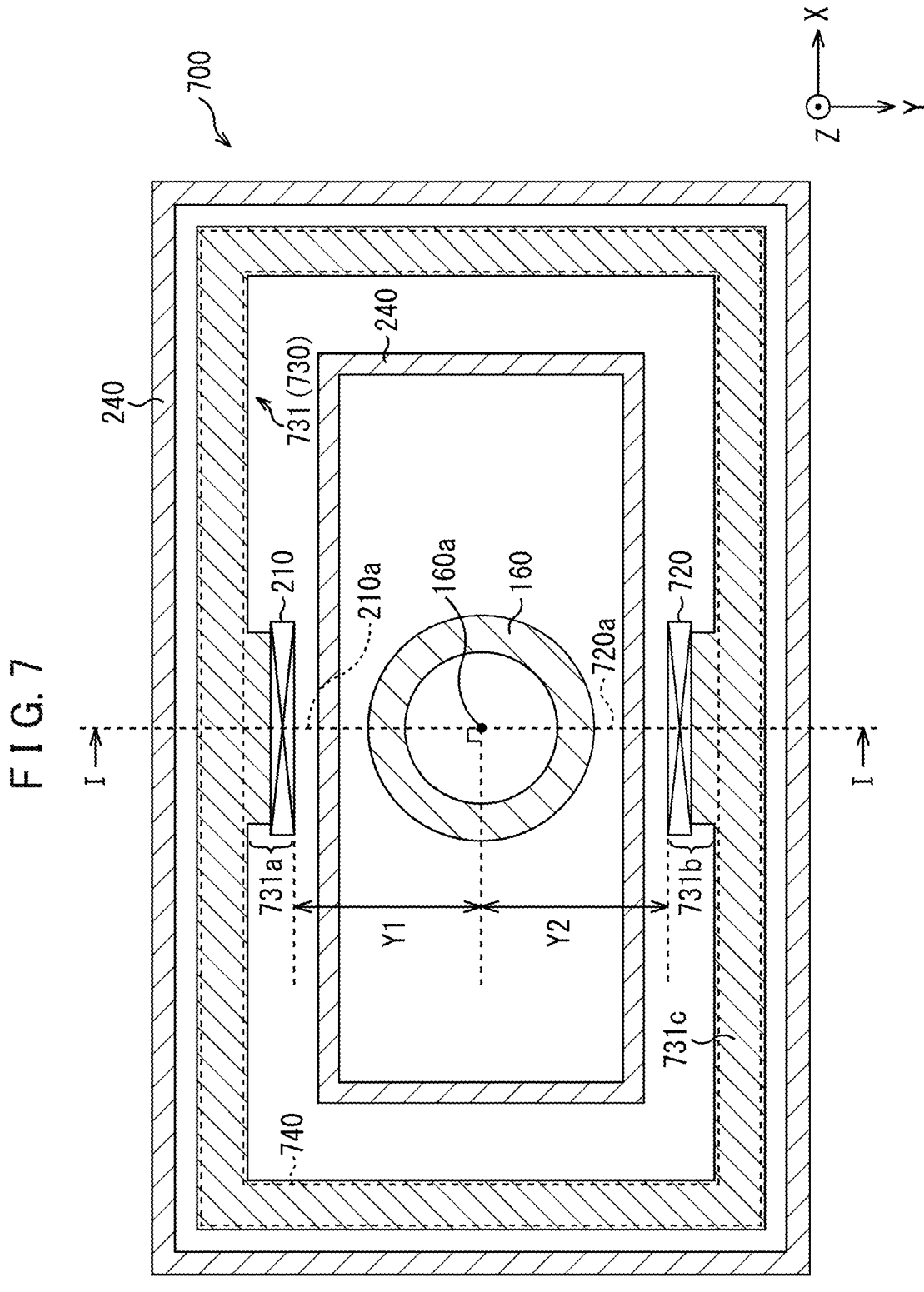
FIG. 7 is a view illustrating one example of a configuration of a flow rate measurement system in a second embodiment.

There will be explained embodiments of the present disclosure with reference to the drawings below.

Incidentally, the fact that objects to be compared such as lengths, positions, sizes, and intervals, are the same includes the case where they are strictly the same, as well as the case where they are different within a range that does not depart from the gist of the disclosure (for example, the case where they are different within a tolerance range defined at the time of design). Further, in each of the drawings, some components are simplified or omitted as necessary for the convenience of explanation and notation. Further, the XYZ coordinates in each of the drawings indicate the orientation relationship in each of the drawings. A symbol with a black circle (●) inside a white circle (○) indicates the direction from the back to the front of the paper. A symbol with a cross mark (x) inside a white circle (○) indicates the direction from the front to the back of the paper.

First Embodiment

First, the first embodiment is explained. In this embodiment, there is explained, as an example, the case of measuring the flow rate of molten steel flowing in a nozzle intended for supplying molten steel in a tundish into a mold when casting a cast slab in a continuous casting facility that continuously casts a multi-layered cast slab in which the concentration of alloying elements in a surface-layer portion of the cast slab is different from that of the inside of the cast slab.

In this embodiment, there is explained, as an example, the case where the continuous casting facility is the continuous casting facility described in Patent Literature 2. However, the continuous casting facility to which the flow rate measurement system in this embodiment is applied is not limited to the continuous casting facility described in Patent Literature 2. Even when the flow rate measurement system in this embodiment is applied to a continuous casting facility in which one immersion nozzle is installed per mold, or even when the flow rate measurement system in this embodiment is applied to a continuous casting facility in which a plurality of immersion nozzles are installed per mold, the advantages as will be described below as examples are obtained.

In the continuous casting facility in which one immersion nozzle is installed per mold, the amount of molten steel to be supplied from the tundish into the mold through the immersion nozzle is adjusted so as to make the level of a molten steel surface in the mold (position in the casting direction) fixed, and thereby the molten steel in the amount equal to the amount of casting of the cast slab can be automatically supplied.

In contrast to this, in the continuous casting facility in which two immersion nozzles are installed per mold, molten steels are simultaneously supplied into the mold from the respective two immersion nozzles. In this case, the balance between the amounts of molten steel to be supplied into the mold from the respective immersion nozzles needs to be adjusted. If it is possible to measure the flow rate of molten steel to be supplied into the mold from at least one of the two immersion nozzles, based on the difference between the mass of molten steel based on the measured value of the flow rate of molten steel and the mass of molten steel in the tundish, the flow rate of molten steel to be supplied into the mold from the other immersion nozzle can be calculated. Then, the amount of molten steel to be supplied into the mold from the immersion nozzle is controlled so as to make the level of the molten steel surface in the mold fixed, and as a result, it enables to execute the flow rate control so that the actual values of the flow rate of molten steel and the flow rate of molten steel that are supplied into the mold from the respective immersion nozzles more accurately are coincident with the target flow rate.

Further, as the continuous casting facility in which one immersion nozzle is installed per mold, there are some continuous casting facilities that cannot always measure the mass of molten steel with sufficient accuracy when controlling the amount of molten steel in the tundish to be supplied into the mold with high accuracy. In such a continuous casting facility, it is desirable to measure the flow rate of molten steel to be supplied into the mold from the tundish through the immersion nozzle without measuring the mass of the molten steel in the tundish. This is because the amount of molten steel to be supplied from the immersion nozzle into the mold is controlled so as to make the level of the molten steel surface in the mold fixed based on the measured value of the flow rate of molten steel to be supplied from the immersion nozzle into the mold, thereby making it possible to automatically supply the molten steel in the amount equal to the amount of casting of the cast slab into the mold from the immersion nozzle.

Moreover, as a normal continuous casting facility in which one immersion nozzle is installed per mold, there are some continuous casting facilities in which molten steel is supplied from one tundish into a plurality of molds. In such a continuous casting facility, the drift of molten steel in the tundish can be measured by measuring the flow rate of molten steel to be supplied into the mold from each of the immersion nozzles.

As above, the continuous casting facility to which the flow rate measurement system in this embodiment is applied is not limited to the continuous casting facility described in Patent Literature 2.

FIG. 1 is a view illustrating one example of a continuous casting facility to which the flow rate measurement system in this embodiment is applied. Incidentally, the continuous casting facility itself can be fabricated using a publicly-known continuous casting facility. Further, as described previously, the continuous casting facility to which the flow rate measurement system in this embodiment is applied is not limited to the continuous casting facility described in Patent Literature 2.

In FIG. 1, the continuous casting facility includes a ladle 110, a component adding device 120, a tundish 130, a mold 140, an inner-layer molten steel nozzle 150, a surface-layer molten steel nozzle 160, a molten steel surface level meter 170, an electromagnetic stirring device 181, and an electromagnetic brake 182.

In this embodiment, there is explained, as an example, the case of supplying molten steel using the single ladle 110 and the single tundish 130. In the tundish 130, a tundish weir 131 having an opening 131a is formed. The tundish 130 is divided into a first region 130a and a second region 130b by the tundish weir 131. The molten steel supplied into the ladle 110 is supplied to the first region 130a of the tundish 130. In the following explanation, the molten steel in the first region 130a is referred to as first molten steel as necessary. The component adding device 120 continuously adds a predetermined element or alloy to the second region 130b of the tundish 130 using a wire or the like. Thereby, the component contained in the molten steel in the second region 130b is adjusted. In the following explanation, the molten steel in the second region 130b is referred to as second molten steel as necessary. In this embodiment, there is explained, as an example, the case where two types of molten steel (the first molten steel and the second molten steel) are kept in the tundish 130.

The inner-layer molten steel nozzle 150 is arranged at a bottom 130c of the first region 130a of the tundish 130. The inner-layer molten steel nozzle 150 has a hollow portion, which links up with the first region 130a of the tundish 130. The inner-layer molten steel nozzle 150 supplies the first molten steel to a relatively lower region in the mold 140. FIG. 1 illustrates, as an example, the case where the inner-layer molten steel nozzle 150 supplies the first molten steel to a region below the later-described electromagnetic brake 182.

The surface-layer molten steel nozzle 160 is arranged at a bottom 130c of the second region 130b of the tundish 130. The surface-layer molten steel nozzle 160 has a hollow portion, which links up with the second region 130b of the tundish 130. The surface-layer molten steel nozzle 160 supplies the second molten steel to a relatively upper region in the mold 140. FIG. 1 illustrates, as an example, the case where the surface-layer molten steel nozzle 160 supplies the second molten steel to a region equivalent to the position of the later-described electromagnetic stirring device 181 in the casting direction (Z-axis direction).

The molten steel surface level meter 170 is a sensor intended for measuring the molten steel surface level in the mold 140 (position in the casting direction).

The electromagnetic stirring device 181 is intended to apply an electromagnetic force to the molten steel (first molten steel) in the mold 140, to thereby provide a stirring flow of the molten steel in a horizontal plane (X-Y plane).

The electromagnetic brake 182 is intended to apply a direct magnetic field to the molten steel in the mold 140, to thereby reduce the downward flow velocity of the molten steel.

With the above continuous casting facility, a solidified shell that has solidified in the relatively upper region in the mold 140 is formed as a surface-layer portion MS of the cast slab, and a solidified shell that has solidified in the relatively lower region in the mold 140 is formed as an inner-layer portion MI of the cast slab.

Figure 4:
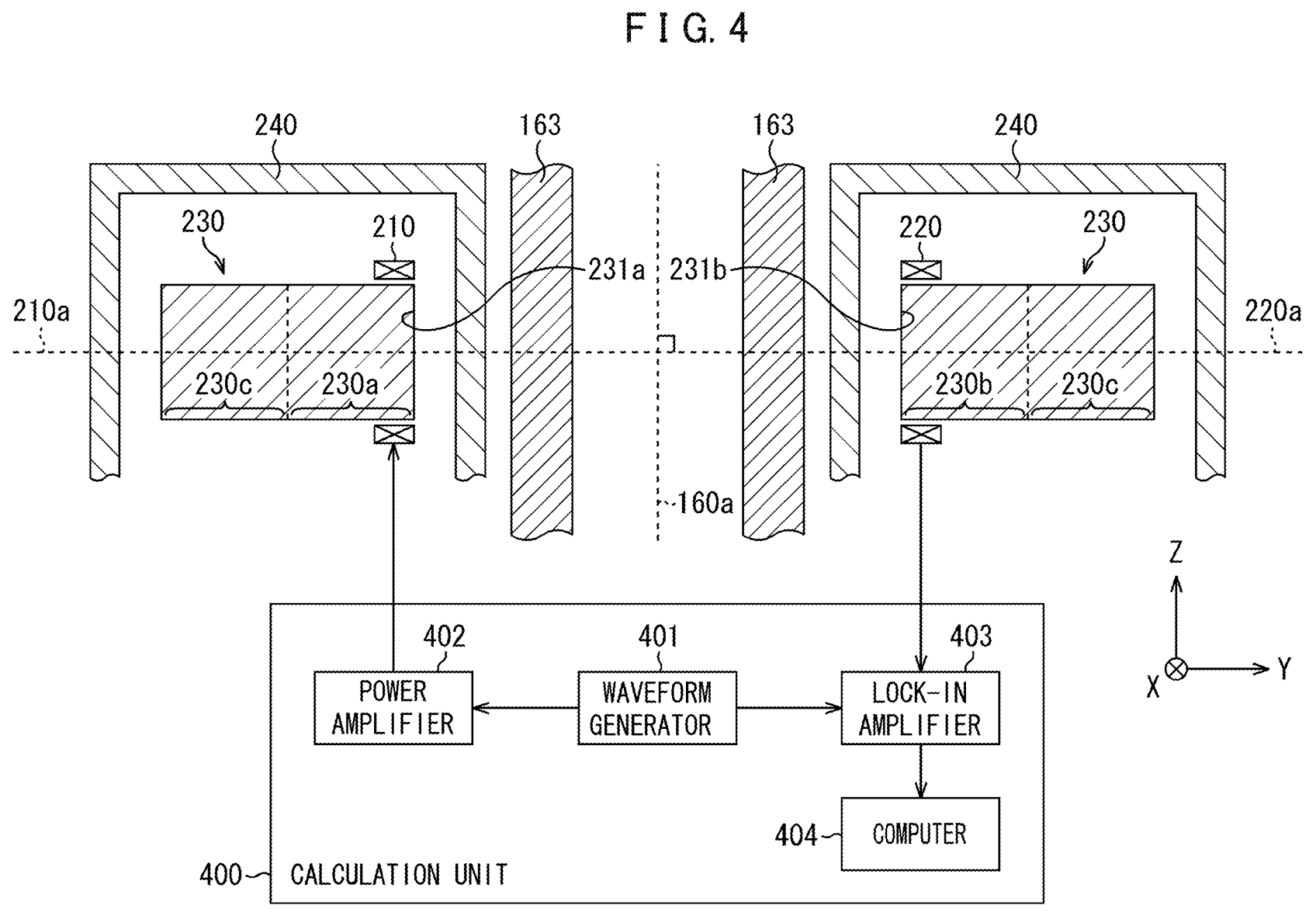

In this embodiment, there is explained, as an example, the case where the flow rate measurement system is applied in order to measure the flow rate of the second molten steel flowing through the surface-layer molten steel nozzle 160. In the following explanation, the second molten steel is abbreviated as molten steel as necessary. FIG. 2 is a view illustrating one example of a configuration of the flow rate measurement system. FIG. 2 is a cross-sectional view taken along I-I in FIG. 1. FIG. 3 is a view illustrating one example of the outline of arrangement of the flow rate measurement system. FIG. 3 is a cross-sectional view taken along I-I in FIG. 2. FIG. 4 is a view illustrating one example of details of the arrangement of the flow rate measurement system.

In FIG. 2 to FIG. 4, the flow rate measurement system includes a flow rate measurement part 200 and a calculation unit 400. The flow rate measurement part 200 performs measurement for deriving the flow rate of the molten steel. The calculation unit 400 performs calculation for deriving the flow rate of the molten steel based on the measurement result by the flow rate measurement part 200.

In this embodiment, the flow rate of the molten steel in the hollow portion of the surface-layer molten steel nozzle 160 is set as an object to be measured. Then, there is explained one example of the configuration of the surface-layer molten steel nozzle 160.

As illustrated in FIG. 3, the surface-layer molten steel nozzle 160 includes an upper nozzle 161, a sliding nozzle 162, and an immersion nozzle 163.

The upper nozzle 161 has a hollow portion, which links up with the opening at the bottom 130c of the second region 130b of the tundish 130. In this embodiment as above, the molten steel in the second region 130b of the tundish 130 flows into the upper nozzle 161. The sliding nozzle 162 is arranged under the upper nozzle 161 to be connected to the upper nozzle 161. Further, the immersion nozzle 163 is arranged under the sliding nozzle 162 to be connected to the sliding nozzle 162.

The sliding nozzle 162 includes a plurality of sliding nozzle plates. In this embodiment, there is explained, as an example, the case where the sliding nozzle 162 includes three sliding nozzle plates of an upper plate 162a, a center plate 162b, and a lower plate 162c. Each of the plates has a molten steel passage opening, and the positions of the molten steel passage openings of the three plates are adjusted by fixing the upper plate 162a and the lower plate 162c and sliding the center plate 162b, and thereby the area of the opening of the sliding nozzle 162 is varied. Thereby, the amount of molten steel to be injected is adjusted. The molten steel whose injection amount has been adjusted by the sliding nozzle 162 is supplied into the mold 140 from the immersion nozzle 163. Incidentally, for adjusting the amount of molten steel to be supplied into the mold 140, a stopper may be used instead of the sliding nozzle 162.

In the surface-layer molten steel nozzle 160, it is the hollow portion of the upper nozzle 161 that is filled with the molten steel. On the other hand, below the upper nozzle 161, the molten steel flows discretely in the space without the hollow portion of the immersion nozzle 163, for example, being filled therewith (that is, the molten steel flows with cavities being formed) in some cases. In the technique described in Patent Literature 2, measuring the flow rate of the molten steel flowing discretely in the space in this manner results in insufficient measurement accuracy. Therefore, in the technique described in Patent Literature 2, the flow rate of the molten steel in the hollow portion of the upper nozzle 161 is set to an object to be measured. In contrast to this, in the flow rate measurement system in this embodiment, the flow rate of the molten steel in the hollow portion of the immersion nozzle 163 is set to an object to be measured. However, in the flow rate measurement system in this embodiment, the flow rate of the molten steel in the hollow portion of the upper nozzle 161 may be set to an object to be measured. In this embodiment as above, the surface-layer molten steel nozzle 160 (immersion nozzle 163) is an example of the pipe through which the molten steel to be measured flows. Incidentally, in the following explanation, the longitudinal direction of the surface-layer molten steel nozzle 160 (immersion nozzle 163) is referred to as the Z-axis direction as necessary.

In this embodiment, as illustrated in FIG. 3, there is explained, as an example, the case where the position of the flow rate measurement part 200 in the Z-axis direction is determined so that the range of the flow rate measurement part 200 in the Z-axis direction (range from the upper end to the lower end) is included in the range of the immersion nozzle 163 in the Z-axis direction (range from the upper end to the lower end).

In FIG. 2 to FIG. 4, the flow rate measurement part 200 includes an excitation coil 210, a detection coil 220, a core 230, and a case 240.

The excitation coil 210 and the detection coil 220 are what are called solenoid coils. When an alternating exciting current flows through the excitation coil 210, a magnetic field is generated from the excitation coil 210. The excitation coil 210 is a coil that generates a magnetic field so as to intersect with the molten steel flowing through the hollow portion of the surface-layer molten steel nozzle 160 (immersion nozzle 163). The orientation of the excitation coil 210 is determined so that such a magnetic field is generated. The detection coil 220 detects, as an induced electromotive force, the time variation in the magnetic field generated from the excitation coil 210 by the alternating exciting current flowing through the excitation coil 210. The orientation of the detection coil 220 is determined so that such a magnetic field can be detected. The magnetic field penetrates the detection coil 220, and thereby, the induced electromotive force is generated at both ends of the detection coil 220.

As illustrated in FIG. 2 and FIG. 4, in this embodiment, there is explained, as an example, the case where the positions of the excitation coil 210 and the detection coil 220 are determined so that a center axis 160a of the surface-layer molten steel nozzle 160 (immersion nozzle 163) is orthogonal to a center axis 210a of the excitation coil 210 and a center axis 220a of the detection coil 220 and the center axis 160a of the surface-layer molten steel nozzle 160 (immersion nozzle 163) intersects with the center axis 210a of the excitation coil 210 and the center axis 220a of the detection coil 220 at one point. Incidentally, it is most preferable that the center axis 160a of the surface-layer molten steel nozzle 160 (immersion nozzle 163) should intersect with the center axis 210a of the excitation coil 210 and the center axis 220a of the detection coil 220 at one point. However, the center axis 210a of the excitation coil 210 and the center axis 220a of the detection coil 220 may deviate from each other. However, in order to inhibit the decrease in measurement accuracy of the flow rate of the molten steel, the amount of deviation in each axis between the center axis 210a of the excitation coil 210 and the center axis 220a of the detection coil 220 is preferably 30 mm or less.

The excitation coil 210 and the detection coil 220 are arranged so that the center axis 210a of the excitation coil 210 intersects with a detection surface of the detection coil 220. Further, the excitation coil 210 and the detection coil 220 are preferably arranged so that the center axis 210a of the excitation coil 210 intersects perpendicularly to the detection surface of the detection coil 220. Furthermore, the excitation coil 210 and the detection coil 220 are most preferably arranged so that the center axis 210a of the excitation coil 210 intersects perpendicularly to the gravity center position of the detection surface of the detection coil 220. The detection surface of the detection coil 220 is, for example, the surface that receives the magnetic field (magnetic flux) generated by the excitation coil 210 at the position closest to the excitation coil 210. More specifically, the detection surface of the detection coil 220 is the surface obtained by cutting the inside (a hollow region) of the detection coil 220 perpendicularly to the center axis 220a of the detection coil 220 at the position closest to the excitation coil 210.

Further, the surface-layer molten steel nozzle 160 (immersion nozzle 163) is arranged between the excitation coil 210 and the detection coil 220. The magnetic field generated from the excitation coil 210 includes a magnetic field that passes through a region of the outer peripheral surface of the surface-layer molten steel nozzle 160 that faces the excitation coil 210 with an interval provided therebetween, the hollow portion of the surface-layer molten steel nozzle 160, and a region of the outer peripheral surface of the surface-layer molten steel nozzle 160 that faces the detection coil 220 with an interval provided therebetween and reaches the detection coil 220. Thus, the magnetic flux based on the magnetic field generated from the excitation coil 210 crosses the surface-layer molten steel nozzle 160 (immersion nozzle 163) and penetrates the detection coil 220, and thereby the induced electromotive force is generated at the detection coil 220. In this embodiment, as illustrated in FIG. 2, there is explained, as an example, the case where an interval Y1 between the excitation coil 210 and the surface-layer molten steel nozzle 160 (immersion nozzle 163) in the casting thickness direction (Y-axis direction) and an interval Y2 between the detection coil 220 and the surface-layer molten steel nozzle 160 (immersion nozzle 163) in the casting thickness direction (Y-axis direction) are the same. It is most preferable that these intervals Y1 and Y2 should be the same. However, these intervals Y1 and Y2 may be different. However, in order to inhibit the decrease in measurement accuracy of the flow rate of the molten steel, the difference between these intervals Y1 and Y2 is preferably 30 mm or less.

Incidentally, as illustrated in FIG. 2 to FIG. 4, in this embodiment, the detection coil is not arranged at a position facing the excitation coil 210 in the direction perpendicular to the Z-axis direction. Further, the excitation coil is not arranged at a position facing the detection coil 220 in the direction perpendicular to the Z-axis direction. As described previously, in the example illustrated in FIG. 2 to FIG. 4, the longitudinal direction of the surface-layer molten steel nozzle 160 is the Z-axis direction and is also the casting direction. Further, in the example illustrated in FIG. 2 to FIG. 4, the direction perpendicular to the Z-axis direction is the casting width direction (X-axis direction).

The core 230 is formed using a soft magnetic material. FIG. 5A is a view conceptually illustrating one example of the excitation coil 210 arranged so as to go around the core 230. FIG. 5B is a view conceptually illustrating one example of the detection coil 220 arranged so as to go around the core 230.

As illustrated in FIG. 5A and FIG. 5B, in this embodiment, there is explained, as an example, the case where the excitation coil 210 and the detection coil 220 are arranged so as to go around the core 230. Further, as illustrated in FIG. 5A, in this embodiment, there is explained, as an example, the case where the excitation coil 210 includes at least a circumference portion 211. Further, in this embodiment, there is explained, as an example, the case where one turn of the excitation coil 210 is made by the single circumference portion 211. In FIG. 5A, for the convenience of notation and explanation, there is explained, as an example, the case where the number of turns of the excitation coil 210 is one. However, the number of turns of the excitation coil 210 is appropriately set so that the magnetic field generated by the excitation coil 210 is detected by the detection coil 220. Incidentally, the circumference portion 211 of the excitation coil 210 is a portion that surrounds the inside (a hollow region) of the excitation coil 210. The circumference portion 211 is a portion through which magnetic fluxes in the same direction penetrate at the same time, regardless of the direction of the current flowing through the excitation coil 210. In other words, the circumference portion 211 is a portion in which magnetic fluxes in different directions do not penetrate the single circumference portion 211 at the same time, regardless of the direction of the current flowing through the excitation coil 210.

Further, as illustrated in FIG. 5B, in this embodiment, there is explained, as an example, the case where the detection coil 220 includes at least a circumference portion 221. Further, in this embodiment, there is explained, as an example, the case where one turn of the detection coil 220 is made by the single circumference portion 221. In FIG. 5B, for the convenience of notation and explanation, there is explained, as an example, the case where the number of turns of the detection coil 220 is one. However, the number of turns of the detection coil 220 is appropriately set so that the magnetic field generated by the excitation coil 210 is detected by the detection coil 220. Incidentally, in FIG. 5A, one end and the other end of the excitation coil 210 are connected to an alternating-current power supply (a waveform generator 401 and a power amplifier 402), and thus the exciting current circulates around the circumference portion 211 of the excitation coil 210. Further, in FIG. 5B, one end and the other end of the detection coil 220 are connected to a voltmeter (a lock-in amplifier 403), and thus the current corresponding to the induced electromotive force circulates around the circumference portion 221 of the detection coil 220. Incidentally, the circumference portion 221 of the detection coil 220 is a portion that surrounds the inside (a hollow region) of the detection coil 220. The circumference portion 221 is a portion through which magnetic fluxes in the same direction penetrate at the same time, regardless of the direction of the current flowing through the detection coil 220. In other words, the circumference portion 221 is a portion in which magnetic fluxes in different directions do not penetrate the single circumference portion 221 at the same time, regardless of the direction of the current flowing through the detection coil 220.

Further, in this embodiment, as illustrated in FIG. 2 and FIG. 4, there is explained, as an example, the case where the core 230 includes a first portion 230a, a second portion 230b, and a third portion 230c. The excitation coil 210 goes around the first portion 230a. The detection coil 220 goes around the second portion 230b. The third portion 230c is magnetically connected to the first portion 230a and the second portion 230b and is arranged so as to go around the surface-layer molten steel nozzle 160 (immersion nozzle 163). The magnetic connection of the third portion 230c with the first portion 230a and the second portion 230b means that a magnetic path is formed between the third portion 230c and the first portion 230a and the second portion 230b.

In this embodiment, as illustrated in FIG. 2 to FIG. 4, there is explained, as an example, the case where the first portion 230a and the second portion 230b have a rectangular parallelepiped shape. Further, there is explained, as an example, the case where tip surfaces 231a and 231b of the first portion 230a and the second portion 230b are planes substantially parallel to the plane determined by the casting direction (Z-axis direction) and the casting width direction (X-axis direction), and are surfaces facing the direction of the surface-layer molten steel nozzle 160 (immersion nozzle 163). That is, the tip surfaces 231a and 231b of the first portion 230a and the second portion 230b face each other with the surface-layer molten steel nozzle 160 (immersion nozzle 163) sandwiched therebetween. Incidentally, the tip surfaces 231a and 231b of the first portion 230a and the second portion 230b are the surfaces, of the end surfaces of the first portion 230a and the second portion 230b, that face the surface-layer molten steel nozzle 160 (immersion nozzle 163) with an interval provided therebetween.

Here, it is most preferable that the center axis of the tip surface 231a of the first portion 230a and the center axis of the tip surface 231b of the second portion 230b should coincide with each other. However, the center axis of the tip surface 231a of the first portion 230a and the center axis of the tip surface 231b of the second portion 230b may deviate from each other. However, in order to inhibit the decrease in measurement accuracy of the flow rate of the molten steel, the amount of deviation between the center axis of the tip surface 231a of the first portion 230a and the center axis of the tip surface 231b of the second portion 230b is preferably 30 mm or less. Incidentally, the center axis of the tip surface 231a of the first portion 230a is a line that passes through the center of gravity of the tip surface 231a of the first portion 230a and is perpendicular to the tip surface 231a of the first portion 230a. The center axis of the tip surface 231b of the second portion 230b is a line that passes through the center of gravity of the tip surface 231b of the second portion 230b and is perpendicular to the tip surface 231b of the second portion 230b.

Further, in this embodiment, as illustrated in FIG. 2 to FIG. 4, there is explained, as an example, the case where the third portion 230c has a hollow rectangular parallelepiped shape. Further, there is explained, as an example, the case where the center axis of the third portion 230c and the center axis 160a of the surface-layer molten steel nozzle 160 (immersion nozzle 163) coincide with each other. As above, it is most preferable that the center axis of the third portion 230c and the center axis 160a of the surface-layer molten steel nozzle 160 (immersion nozzle 163) should coincide with each other. However, the center axis of the third portion 230c and the center axis 160a of the surface-layer molten steel nozzle 160 (immersion nozzle 163) may deviate from each other. However, in order to inhibit the decrease in measurement accuracy of the flow rate of the molten steel, the amount of deviation in each axis between the center axis of the third portion 230c and the center axis 160a of the surface-layer molten steel nozzle 160 (immersion nozzle 163) is preferably 30 mm or less.

Furthermore, the core 230 has a shape that is axisymmetric about a virtual straight line passing through the center of gravity of the core 230 (the third portion 230c) and extending in the casting thickness direction (Y-axis direction) as an axis of symmetry. Further, the core 230 has a shape that is axisymmetric about a virtual straight line passing through the center of gravity of the core 230 (the third portion 230c) and extending in the casting width direction (X-axis direction) as an axis of symmetry. Thus, base end surfaces of the first portion 230a and the second portion 230b are arranged on the inner peripheral surface of the third portion 230c so that the core 230 has such a shape. Incidentally, in this embodiment, as illustrated in FIG. 2 to FIG. 4, there is explained, as an example, the case where the first portion 230a, the second portion 230b, and the third portion 230c are integrated and are not able to be separated. That is, in FIG. 4, for the convenience of notation and explanation, the boundary line between the first portion 230a and the third portion 230c and the boundary line between the second portion 230b and the third portion 230c are each illustrated by dashed lines (virtual lines). However, in reality, such boundary lines do not exist. That is, the base end surfaces of the first portion 230a and the second portion 230b and the inner peripheral surface of the third portion 230c are illustrated by the boundary lines (dashed lines) in FIG. 4.

The case 240 is made using a heat insulating material and is intended to prevent the excitation coil 210, the detection coil 220, and the core 230 from being overheated by radiant heat from molten steel. The case 240 is preferably formed using a nonmagnetic and nonmetallic (preferably insulating) material. Inside the case 240, the excitation coil 210, the detection coil 220, and the core 230 configured as described above are housed. A cooling medium (such as dry air) may be supplied from the outside of the case 240 to the inside toward the excitation coil 210, the detection coil 220, and the core 230. In this case, for example, the flow of the cooling medium circulating in a direction perpendicular to the Z-axis direction (X-Y plane) may be formed inside the case 240 (a hollow region) illustrated in FIG. 2. For example, one or more through holes may be formed in a partial region of the side surface of the case 240. In this case, a pipe serving as a path for the cooling medium is attached to the through hole/through holes. Additionally, a fan or blower is attached to the pipe. Thereby, inside the case 240 (a hollow region) illustrated in FIG. 2, the flow of the cooling medium circulating in a direction perpendicular to the direction in which molten steel flows is formed.

FIG. 6A to FIG. 6C are views each conceptually explaining one example of the measurement principle of the flow rate measurement part 200. In FIG. 6A to FIG. 6C, arrow lines indicate lines of magnetic force.

FIG. 6A is a view that explains a magnetic field H (magnetic flux Φ) when molten steel (molten metal) is not present. In FIG. 6A, when the alternating exciting current flows through the excitation coil 210, the magnetic field H (magnetic flux Φ) is generated from the excitation coil 210 according to Ampere's rule (right-handed screw rule). A magnetic flux density B corresponding to the magnetic field H generated at this time is high near the center axis of the excitation coil 210. In FIG. 6A to FIG. 6C, this is represented by shortening the interval between the arrow lines.

In FIG. 6A, since no molten steel (molten metal) is present between the excitation coil 210 and the detection coil 220, the magnetic field H (magnetic flux Φ) generated from the excitation coil 210 is directed toward the detection coil 220 without being affected by molten steel. In FIG. 6A, to simplify the explanation, it is assumed that the magnetic fields H (magnetic fluxes Φ) generated from the excitation coil 210 all travel straight in the casting thickness direction (Y-axis direction). Using the core 230 makes it possible to inhibit the magnetic field H (magnetic flux Φ) generated from the excitation coil 210 from spreading spatially. Accordingly, the region where the magnetic field H (magnetic flux Φ) is generated can be limited and made uniform. The magnetic field H (magnetic flux Φ) generated from the excitation coil 210 penetrates the detection coil 220. As a result, the induced electromotive force is generated at both ends of the detection coil 220 according to Faraday's law of electromagnetic induction.

FIG. 6B is a view that explains the magnetic field H (magnetic flux Φ) when molten steel (molten metal) whose flow velocity is 0 (zero) is present. As in the case illustrated in FIG. 6A, when the alternating exciting current flows through the excitation coil 210, the magnetic field H (magnetic flux Φ) is generated from the excitation coil 210. In FIG. 6B, since molten steel (molten metal) is present between the excitation coil 210 and the detection coil 220, an eddy current $I_e$ flows in the molten steel so as to cancel the magnetic field H according to Lenz's law. Therefore, the magnetic field H (magnetic flux Φ) reaching the detection coil 220 is smaller than that illustrated in FIG. 6A. In FIG. 6B, this is represented by illustrating the arrow lines that indicate the magnetic field H (magnetic flux Φ) as dashed lines.

FIG. 6C is a view that explains the magnetic field H (magnetic flux Φ) when molten steel (molten metal) flowing in the casting progress direction (negative direction of the Z axis (direction of the white arrow line)) is present. As in the cases illustrated in FIG. 6A and FIG. 6B, the magnetic field H (magnetic flux Φ) is generated from the excitation coil 210 when the alternating exciting current flows through the excitation coil 210. Further, as in the case illustrated in FIG. 6B, the eddy current $I_e$ flows in the molten steel so as to cancel the magnetic field H (magnetic flux Φ). In FIG. 6C, the molten steel flows in the flowing direction of molten steel (negative direction of the Z axis). The eddy current $I_e$ is (slightly) dragged in the flowing direction of molten steel (negative direction of the Z axis) by this molten steel flow. As the eddy current $I_e$ is dragged in the flowing direction of molten steel (negative direction of the Z axis) in this manner, the magnetic field H (magnetic flux Φ) is also dragged in the flowing direction of molten steel (negative direction of the Z axis).

Here, an induced electromotive force V generated at both ends of the detection coil 220 is proportional to the time variation (dΦ/dt) in the magnetic flux Φ penetrating the detection coil 220, and thus the relationship of V=α dΦ/dt is established when a proportional coefficient is set to α. Further, a deviation amount z between the eddy current $I_e$ and the magnetic field H (magnetic flux) due to the flow of molten steel is in a proportional relationship with a flow velocity v of molten steel. Here, the deviation amount z between the eddy current $I_e$ and the magnetic field H (magnetic flux) due to the flow of molten steel is the amount of deviation in the flowing direction of molten steel (negative direction of the Z axis). Therefore, the magnetic flux Φ penetrating the detection coil 220 is also in a proportional relationship with the flow velocity v of the molten steel. Therefore, as illustrated in FIG. 6C, the magnetic field H (magnetic flux Φ) penetrating the detection coil 220 decreases according to the deviation amount z between the eddy current $I_e$ and the magnetic field H (magnetic flux) due to the flow of molten steel. As above, the deviation amount z between the eddy current $I_e$ and the magnetic field H (magnetic flux) due to the flow of molten steel and the magnetic field H (magnetic flux Φ) penetrating the detection coil 220 are in a proportional relationship. In FIG. 6C, this is represented by the bottom dashed arrow line not penetrating the detection coil 220. As described previously, the deviation amount z between the eddy current $I_e$ and the magnetic field H (magnetic flux) due to the flow of molten steel and the flow velocity v of molten steel are in a proportional relationship. Therefore, the magnetic flux Φ penetrating the detection coil 220 is also in a proportional relationship with the flow velocity v of molten steel (Φ can be approximated by a linear function of v). Therefore, the induced electromotive force V generated at both ends of the detection coil 220 is expressed as V=α dΦ(v)/dt when the proportional coefficient is set to α.

In FIG. 4, the calculation unit 400 includes the waveform generator 401, the power amplifier 402, the lock-in amplifier 403, and a computer 404.

The waveform generator 401 generates a sine wave. The power amplifier 402 is, for example, a constant current amplifier, which amplifies the sine wave generated by the waveform generator 401 to generate an exciting current and supplies it to the excitation coil 210. Here, an excitation frequency (frequency of the exciting current) is preferably a frequency other than commercial frequencies. This is because it is possible to inhibit signals generated from other electric devices or the like driven at commercial frequencies from being detected as noise by the detection coil 220. Further, from the viewpoint of improving the S/N ratio, the excitation frequency is preferably higher than the commercial frequencies, but may be lower than the commercial frequencies. For example, an alternating current with a frequency of 30 Hz and an effective value of 1 A may be set as the exciting current. In this embodiment, one example of a current supply device is fabricated by using the waveform generator 401 and the power amplifier 402.

The signal of the induced electromotive force detected by the detection coil 220 is input to a filter. Noise signals in unnecessary bands, which are contained in the signal of the induced electromotive force detected by the detection coil 220, are removed by the filter. For example, a low-pass filter is used as the filter. For example, a low-pass filter with a cutoff frequency of 40 Hz is used. However, the filter is not limited to the low-pass filter. For example, a band-pass filter may be used. The signal of the induced electromotive force detected by the detection coil 220 is the time variation in magnetic field, and thus, there is a phase difference of −90° between the magnetic field excited by the excitation coil 210 and the induced electromotive force detected by the detection coil 220. Therefore, the lock-in amplifier 403 detects, from the signals that have passed through the filter, a component whose phase is shifted by −90° with respect to the exciting current to the excitation coil 210. This reference phase signal for detection is supplied from the waveform generator 401 to the lock-in amplifier 403. For example, only the frequency component of 30 Hz is detected by the lock-in amplifier 403. The signal after the detection by the lock-in amplifier 403 is a flow velocity source signal that serves as the source of flow velocity measurement. The flow velocity source signal is sent to the computer 404 as a calculation device. The computer 404 derives the flow velocity of the molten steel flowing through the hollow portion of the surface-layer molten steel nozzle 160 (immersion nozzle 163) based on the flow velocity source signal. Then, the computer 404 derives the flow rate of the molten steel based on the flow velocity of the molten steel flowing through the hollow portion of the surface-layer molten steel nozzle 160 (immersion nozzle 163), and outputs information on the flow rate of the molten steel. The form of output includes at least one of displaying on a computer display, transmission to an external device, and storing in a storage medium internal or external to the computer 404, for example. In this embodiment, one example of a flow rate deriving device is fabricated by using the lock-in amplifier 403 and the computer 404.

The flow velocity of the molten steel flowing through the hollow portion of the surface-layer molten steel nozzle 160 (immersion nozzle 163) is derived as follows, for example. As described previously, the relationship of V=a dΦ(v)/dt is established. Therefore, the flow velocity source signal (induced electromotive force) V when the flow velocity v is varied is derived by conducting a simulation or numerical simulation. Then, based on the pair of the flow velocity v and the flow velocity source signal (induced electromotive force) V that is derived, a regression analysis, or the like, is performed using the fact that the relationship of V=α dΦ(v)/dt and Φ are a linear function of v. Then, based on the result of the regression analysis or the like, the coefficients and constants of the function Φ(v) and the proportional coefficient α are determined. Incidentally, the proportional coefficient α may be included in the function Φ(v). The computer 404 derives the flow velocity v by setting the flow velocity source signal to V of V=α dΦ(v)/dt, for example. When deriving the flow velocity v as described above, the flow velocity source signal obtained when the molten steel is not present in the hollow portion of the surface-layer molten steel nozzle 160 (immersion nozzle 163) is preferably used as a reference signal (signal corresponding to the reference voltage (0 (zero) voltage). In this case, the value obtained by subtracting the reference signal from the flow velocity source signal corresponds to V of V=α dΦ(v)/dt.

The flow rate of the molten steel flowing through the hollow portion of the surface-layer molten steel nozzle 160 (immersion nozzle 163) is derived as follows, for example.

The flow velocity of the molten steel flowing through the hollow portion of the surface-layer molten steel nozzle 160 (immersion nozzle 163) and the cross-sectional area assumed as the cross-sectional area of the molten steel in the direction perpendicular to the flowing direction are multiplied together, and thereby the volumetric flow rate of the molten steel flowing through the hollow portion of the surface-layer molten steel nozzle 160 (immersion nozzle 163) is derived. The mass flow rate of the molten steel flowing through the hollow portion of the surface-layer molten steel nozzle 160 (immersion nozzle 163) is derived based on the volumetric flow rate of the molten steel flowing through the hollow portion of the surface-layer molten steel nozzle 160 (immersion nozzle 163) and the density of the molten steel. The flow rate of the molten steel may be the volumetric flow rate or mass flow rate.

The cross-sectional area assumed as the cross-sectional area of the molten steel in the direction perpendicular to the flowing direction is determined as follows, for example. The molten steel flowing through the hollow portion of the surface-layer molten steel nozzle 160 (immersion nozzle 163) sometimes flows discretely inside the hollow portion.

Then, the cross-sectional area of the molten steel flowing through the hollow portion of the surface-layer molten steel nozzle 160 (immersion nozzle 163) when, for example, the area of the opening of the sliding nozzle 162 and the variation in mass of the molten steel in the tundish 130 per unit time are varied is derived from actual cast slab manufacture data, for example. The cast slab manufacture data include the mass of molten steel in the tundish 130 and the area of the opening of the sliding nozzle 162, as well as the molten steel surface level in the mold 140. Then, the relationship between the area of the opening of the sliding nozzle 162, the variation in mass of the molten steel in the tundish 130 per unit time, and the cross-sectional area of the molten steel flowing through the hollow portion of the surface-layer molten steel nozzle 160 (immersion nozzle 163) is derived by performing a regression analysis or the like. Thereafter, the variation in mass of the molten steel in the tundish 130 per unit time is measured, and the area of the opening of the sliding nozzle 162 is obtained, and from the relationship derived as described above, the cross-sectional area of the molten steel flowing through the hollow portion of the surface-layer molten steel nozzle 160 (immersion nozzle 163) is derived as the cross-sectional area assumed as the cross-sectional area of the molten steel in the direction perpendicular to the flowing direction. Although the actual cross-sectional shape of the molten steel may be significantly deformed, the cross-sectional area derived in this manner is sufficient on average for long-time cast slab manufacture.

In this embodiment, there is explained, as an example, the case where the cross-sectional area assumed as the cross-sectional area of the molten steel in the direction perpendicular to the flowing direction is derived as above. In this case, the cross-sectional area assumed as the cross-sectional area of the molten steel in the direction perpendicular to the flowing direction can be derived with high accuracy. However, the cross-sectional area of the hollow portion of the immersion nozzle 163 may be set as an approximate value of the cross-sectional area assumed as the cross-sectional area of the molten steel in the direction perpendicular to the flowing direction (the cross-sectional area of the hollow portion of the immersion nozzle 163 is the cross-sectional area in the direction perpendicular to the center axis of the immersion nozzle 163). Incidentally, the hollow portion of the upper nozzle 161 is filled with the molten steel flowing through the hollow portion of the upper nozzle 161. Therefore, when the flow rate of the molten steel in the hollow portion of the upper nozzle 161 is set to an object to be measured, the cross-sectional area of the hollow portion of the immersion nozzle 163 may be set to the cross-sectional area assumed as the cross-sectional area of the molten steel in the direction perpendicular to the flowing direction, in the case where the hollow portion of the upper nozzle 161 is filled with the molten steel flowing through the hollow portion of the upper nozzle 161.

As above, in this embodiment, the excitation coil 210 and the detection coil 220 are arranged with the surface-layer molten steel nozzle 160 (immersion nozzle 163) sandwiched therebetween. A magnetic field is generated from the excitation coil 210 so as to intersect with the molten steel flowing through the hollow portion of the surface-layer molten steel nozzle 160 (immersion nozzle 163), and the time variation in the magnetic field is detected as the induced electromotive force by the detection coil 220. The calculation unit 400 derives the flow rate of the molten steel flowing through the hollow portion of the surface-layer molten steel nozzle 160 (immersion nozzle 163) based on the induced electromotive force. Therefore, the flow rate of the molten steel flowing through the hollow portion of the surface-layer molten steel nozzle 160 (immersion nozzle 163) can be measured with high accuracy in a non-contact manner.

For example, as compared to Patent Literature 2, even if the excitation coil 210 and the detection coil 220 are separated from the surface-layer molten steel nozzle 160 (immersion nozzle 163), it is possible to inhibit the signal strength of the induced electromotive force from decreasing. As a result, as compared to Patent Literature 2, it is no longer necessary to increase the size of the device in order to increase the signal strength of the induced electromotive force. Therefore, the operational burden associated with the increase in size of the device can be reduced. For example, it is possible to inhibit a work space from becoming smaller as the device becomes larger. Further, even if the molten steel flows discretely (with cavities being formed) in the space of the hollow portion of the immersion nozzle 163 without the hollow portion being filled with the molten steel, the flow rate of the molten steel flowing through the hollow portion of the surface-layer molten steel nozzle 160 (immersion nozzle 163) can be measured with higher accuracy, as compared to Patent Literature 2. Further, as compared to Patent Literature 2, the influence of noise contained in the signal of the induced electromotive force can be reduced.

Further, in this embodiment, the excitation coil 210 and the detection coil 220 are made to go around the core 230. Therefore, it makes it easier for the magnetic field generated from the excitation coil 210 to reach the detection coil 220. Specifically, in this embodiment, the core 230 includes the first portion 230*a* where the excitation coil 210 is arranged, the second portion 230*b* where the detection coil 220 is arranged, and the third portion 230*c* that is magnetically connected to the first portion 230*a* and the second portion 230*b* and arranged so as to go around (surround) the surface-layer molten steel nozzle 160 (immersion nozzle 163). Specifically, in this embodiment, the third portion 230*c* has a shape closed around the surface-layer molten steel nozzle 160 (immersion nozzle 163) in the cross section perpendicular to the Z-axis direction. Therefore, by inhibiting the magnetic field H (magnetic flux) generated from the excitation coil 210 from spreading spatially, the region where the magnetic field H (magnetic flux Φ) is generated can be limited and made uniform. Therefore, the magnetic field H (magnetic flux Φ) can be made to reach the detection coil 220 more easily. Therefore, the influence of noise contained in the signal of the induced electromotive force can be further reduced. Further, the magnetic field H (magnetic flux Φ) leaking to the outside can be reduced, thus inhibiting the adverse effect on the outside. Incidentally, in the following explanation, the cross section perpendicular to the Z-axis direction is referred to as an X-Y cross section as necessary.

Further, in this embodiment, the detection coil 220 includes at least the circumference portion 221. Further, one turn of the detection coil 220 is made by the single circumference portion 221. Therefore, the configuration of the detection coil 220 and the core 230 can be simplified.

MODIFIED EXAMPLES

First Modified Example

In this embodiment, there has been explained, as an example, the case of using the core 230. However, it is not always necessary to use the core 230. For example, an air-core type coil may be used as the excitation coil 210 and the detection coil 220. The air-core type coil is wound around a bobbin made of ceramics, for example.

Second Modified Example

In this embodiment, there has been explained, as an example, the case of using the detection coil 220. However, the detector that detects the magnetic field or the time variation in the magnetic field is not limited to the detection coil 220. For example, another magnetic sensor such as a Hall element may be used as the detector.

Third Modified Example

In this embodiment, there has been explained, as an example, the case where the processing to derive the flow rate of the molten steel is performed by software installed on the computer 404. However, this embodiment is not necessarily configured in this manner. For example, the processing may be performed using hardware (for example, an analog circuit, or the like) instead of the software.

Fourth Modified Example

In this embodiment, there has been explained, as an example, the case of using the lock-in amplifier 403 for detecting the signal from the detection coil 220. However, this embodiment is not necessarily configured in this manner. For example, a desired phase component may be detected from the signal from the detection coil 220 using a synchronous detector or the like.

Fifth Modified Example

In this embodiment, there has been explained, as an example, the case where the flow rate of the molten steel of the surface-layer molten steel nozzle 160 is set to an object to be measured. However, as the object to be measured of the flow rate of the molten steel, the flow rate of the molten steel of the inner-layer molten steel nozzle 150 may be set to the object to be measured. Further, the flow rate measurement system may be applied to each of the inner-layer molten steel nozzle 150 and the surface-layer molten steel nozzle 160.

Sixth Modified Example

In this embodiment, there has been explained, as an example, the case where the flow rate measurement system is applied to the continuous casting facility that continuously casts a multi-layered cast slab in which the concentration of alloying elements in the surface-layer portion of the cast slab is different from that of the inside of the cast slab. However, the destination to which the flow rate measurement system is applied is not limited to this as long as the flow rate of molten metal flowing through a hollow portion of a pipe can be measured. For example, the flow rate measurement system in this embodiment may be applied to a continuous casting facility in which one nozzle is installed as a nozzle (immersion nozzle) for supplying molten steel from a tundish to a mold.

Seventh Modified Example

In this embodiment, there has been explained, as an example, the case where the third portion 230*c* of the core 230 has a hollow rectangular parallelepiped shape. However, the shape of the third portion of the core is not limited to the hollow rectangular parallelepiped shape. For example, the shape of the X-Y cross section of the third portion of the core may be recessed. In this case, the third portion of the core has, for example, a shape obtained by excluding the region on the positive-direction side of the X axis relative to the first portion 230*a* and the second portion 230*b* from the third portion 230*c* illustrated in FIG. 2.

Second Embodiment

Next, the second embodiment is explained. In the first embodiment, there has been explained, as an example, the case where one turn of the detection coil 220 is made by the single circumference portion 221. In contrast to this, in the present embodiment, there is explained the case where one turn of the detection coil is made by two circumference portions of a first circumference portion and a second circumference portion. As above, this embodiment differs from the first embodiment mainly in the configuration and processing due to the difference in the configuration of the detection coil. Therefore, in the explanation of this embodiment, the same components as those in the first embodiment are denoted by the same reference numerals and symbols as those illustrated in FIG. 1 to FIG. 6A to FIG. 6C, and detailed explanations thereof are omitted.

There is explained, as an example, the case where a flow rate measurement system is applied to the continuous casting facility described in the first embodiment, also in this embodiment. FIG. 7 is a view illustrating one example of a configuration of the flow rate measurement system. FIG. 7 is a view corresponding to FIG. 2. FIG. 8 is a view illustrating one example of details of arrangement of the flow rate measurement system. FIG. 8 is a view corresponding to FIG. 4.

In FIG. 7 to FIG. 8, the flow rate measurement system includes a flow rate measurement part 700 and the calculation unit 400. In this embodiment as well, as in the first embodiment, the flow rate of the molten steel in the hollow portion of the immersion nozzle 163 is set to an object to be measured. However, in the flow rate measurement system in this embodiment as well, the flow rate of the molten steel in the hollow portion of the upper nozzle 161 may be set to an object to be measured, similarly to the flow rate measurement system in the first embodiment.

Further, in this embodiment as well, there is explained, as an example, the case where the position of the flow rate measurement part 700 in the Z-axis direction is determined so that the range of the flow rate measurement part 700 in the Z-axis direction (range from the top to the bottom) is included in the range of the immersion nozzle 163 in the Z-axis direction (range from the top to the bottom), as in the first embodiment (see FIG. 3).

The flow rate measurement part 700 includes the excitation coil 210, a detection coil 720, a core 730, a spacer 740, and the case 240.

The excitation coil 210 and the case 240 are the same as those explained in the first embodiment.

The detection coil 720 is what is called a solenoid coil. FIG. 9A is a view conceptually illustrating one example of the excitation coil 210 arranged so as to go around the core 730. FIG. 9B is a view conceptually illustrating one example of the detection coil 720 (FIG. 9B) arranged so as to go around the core 730.

As illustrated in FIG. 9A and FIG. 9B, in this embodiment, there is explained, as an example, the case where the excitation coil 210 and the detection coil 720 are arranged so as to go around the core 730. Further, as illustrated in FIG. 9A, in this embodiment as well, there is explained, as an example, the case where the excitation coil 210 includes at least the single circumference portion 211, as in the first embodiment. Further, in this embodiment as well, there is explained, as an example, the case where one turn of the excitation coil 210 is made by the single circumference portion 211, as in the first embodiment.

Further, as illustrated in FIG. 9B, in this embodiment, the detection coil 720 includes at least one first circumference portion 721 and at least one second circumference portion 722. In this embodiment, there is explained, as an example, the case where the number of first circumference portions 721 and the number of second circumference portions 722 are the same. However, the number of first circumference portions 721 and the number of second circumference portions 722 may be different. For example, the difference between the number of first circumference portions 721 and the number of second circumference portions 722 may be one. The first circumference portion 721 of the detection coil 720 is a portion that surrounds the inside (a hollow region) of the detection coil 720. The first circumference portion 721 is a portion through which magnetic fluxes in the same direction penetrate at the same time, regardless of the direction of the current flowing through the detection coil 720. The second circumference portion 722 of the detection coil 720 is also a portion that surrounds the inside (a hollow region) of the detection coil 720. Further, the second circumference portion 722 is also a portion through which magnetic fluxes in the same direction penetrate at the same time, regardless of the direction of the current flowing through the detection coil 720. One turn of the detection coil 720 is made by the single first circumference portion 721 and the single second circumference portion 722 connected to the first circumference portion 721. In FIG. 9B, for the convenience of notation and explanation, there is explained, as an example, the case where the number of turns of the detection coil 720 is one. However, the number of turns of the detection coil 720 is appropriately set so that the magnetic field generated by the excitation coil 210 is detected by the detection coil 720. The one-turn portion of the detection coil 720 has, as a whole, a shape obtained by twisting the one-turn portion of the detection coil 220 in the first embodiment into an 8-shape of Arabic numeral.

Therefore, when the current from one end of the detection coil 720 toward the other end flows, the first circumference portion 721 and the second circumference portion 722 are connected so as to make the magnetic flux penetrating the first circumference portion 721 and the magnetic flux penetrating the second circumference portion 722 at the same time opposite to each other in direction. That is, the first circumference portion 721 and the second circumference portion 722 are connected so as to make the current flowing through the first circumference portion 721 and the current flowing through the second circumference portion 722 opposite in direction when the magnetic fluxes in the same direction penetrate the first circumference portion 721 and the second circumference portion 722 at the same time. In the example illustrated in FIG. 9B, the direction of the current that is about to flow through the first circumference portion 721 and the second circumference portion 722 when the magnetic fluxes Φ from the back side of the paper to the front side penetrate the first circumference portion 721 and the second circumference portion 722 at the same time is illustrated by the arrow line attached beside the detection coil 720. As illustrated in FIG. 9B, the current flowing through the first circumference portion 721 and the current flowing through the second circumference portion 722 are opposite in direction. Therefore, the directions of the magnetic fluxes penetrating the first circumference portion 721 and the second circumference portion 722 at the same time are the same. When the amount of magnetic flux penetrating the first circumference portion 721 and the amount of magnetic flux penetrating the second circumference portion 722 are the same, the current flowing through the first circumference portion 721 and the current flowing through the second circumference portion 722 completely cancel each other out. Therefore, the induced electromotive force generated at both ends of the detection coil 720 becomes 0 (zero). On the other hand, for example, when the amounts of magnetic fluxes in the same direction penetrating the first circumference portion 721 and the second circumference portion 722 at the same time are different, the current flowing through the first circumference portion 721 and the current flowing through the second circumference portion 722 cancel each other out. Further, the current, which corresponds to the difference between the current flowing through the circumference portion with a larger amount of magnetic flux to penetrate out of the first circumference portion 721 and the second circumference portion 722 and the current flowing through the circumference portion with a smaller amount of magnetic flux to penetrate out of the first circumference portion 721 and the second circumference portion 722, flows in the same direction as the direction of the current flowing through the circumference portion with a larger amount of magnetic flux to penetrate. Therefore, the induced electromotive force corresponding to the difference between the amount of magnetic flux penetrating the first circumference portion 721 and the amount of magnetic flux penetrating the second circumference portion 722 at the same time is generated at both ends of the detection coil 720. Incidentally, in FIG. 9B, one end and the other end of the detection coil 720 are connected to the voltmeter (lock-in amplifier 403), and thus, the current corresponding to the induced electromotive force circulates around the first circumference portion 721 and the second circumference portion 722 of the detection coil 720.

As illustrated in FIG. 7 to FIG. 8, in this embodiment as well, as in the first embodiment, there is explained, as an example, the case where the positions of the excitation coil 210 and the detection coil 720 are determined so that the center axis 160a of the surface-layer molten steel nozzle 160 (immersion nozzle 163) is orthogonal to the center axis 210a of the excitation coil 210 and a center axis 720a of the detection coil 720 and the center axis 160a of the surface-layer molten steel nozzle 160 (immersion nozzle 163) intersects with the center axis 210a of the excitation coil 210 and the center axis 720a of the detection coil 720 at one point. However, as has been explained in the first embodiment, this embodiment is not necessarily configured in this manner.

Further, as illustrated in FIG. 7, in this embodiment as well, there is explained, as an example, the case where the interval Y1 between the excitation coil 210 and the surface-layer molten steel nozzle 160 (immersion nozzle 163) in the casting thickness direction (Y-axis direction) and the interval Y2 between the detection coil 720 and the surface-layer molten steel nozzle 160 (immersion nozzle 163) in the casting thickness direction (Y-axis direction) are the same, as in the first embodiment. However, as has been explained in the first embodiment, these intervals Y1 and Y2 may be different.

Incidentally, there is explained, as an example, the case where the detection coil 720 is integrated and cannot be separated. There is no boundary line between the first circumference portion 721 and the second circumference portion 722.

The core 730 is formed using a soft magnetic material. The detection coil 720 needs to be arranged so as to go around the core 730. Thus, as illustrated in FIG. 8, FIG. 9A, and FIG. 9B, the core 730 includes a first core 731 that is arranged on the upstream side (upper side) in the Z-axis direction relatively, and a second core 732 that is arranged on the downstream side (lower side) in the Z-axis direction relatively.

In this embodiment, as illustrated in FIG. 7 to FIG. 8, there is explained, as an example, the case where the first core 731 includes the first portion 731a, the second portion 731b, and the third portion 731c, and the second core 732 includes the first portion 732a, the second portion 732b, and the third portion 732c. The excitation coil 210 goes around the entire first portions 731a and 732a. The detection coil 720 goes around each of the second portions 731b and 732b. The third portion 731c is magnetically connected to the first portion 731a and the second portion 731b and is arranged so as to go around the surface-layer molten steel nozzle 160 (immersion nozzle 163).

In this embodiment, as illustrated in FIG. 7 to FIG. 8, there is explained, as an example, the case where the first portion 731a and the second portion 731b have a rectangular parallelepiped shape. Further, there is explained, as an example, the case where tip surfaces 733a and 733b of the first portion 731a and the second portion 731b are planes substantially parallel to the plane determined by the casting direction (Z-axis direction) and the casting width direction (X-axis direction), and are surfaces facing the direction of the surface-layer molten steel nozzle 160 (immersion nozzle 163). That is, the tip surfaces 733a and 733b of the first portion 731a and the second portion 731b face each other with the surface-layer molten steel nozzle 160 (immersion nozzle 163) sandwiched therebetween. Further, in this embodiment, as illustrated in FIG. 7 to FIG. 8, there is explained, as an example, the case where the third portion 731c has a hollow rectangular parallelepiped shape. Further, there is explained, as an example, the case where the center axis of the third portion 731c and the center axis 160a of the surface-layer molten steel nozzle 160 (immersion nozzle 163) coincide with each other. In this case, the center axis of the first core 731 and the center axis of the third portion 731c coincide with each other. However, as has been explained in the first embodiment, the center axis of the third portion 731c and the center axis 160a of the surface-layer molten steel nozzle 160 (immersion nozzle 163) do not necessarily need to coincide with each other.

Further, the first core 731 has a shape that is axisymmetric about a virtual straight line passing through the center of gravity of the first core 731 and extending in the casting thickness direction (Y-axis direction) as an axis of symmetry. Further, the first core 731 has a shape that is axisymmetric about a virtual straight line passing through the center of gravity of the first core 731 and extending in the casting width direction (X-axis direction) as an axis of symmetry. Thus, base end surfaces of the first portion 731a and the second portion 731b are arranged on the inner peripheral surface of the third portion 731c so that the first core 731 has such a shape. Incidentally, in this embodiment, as illustrated in FIG. 7 to FIG. 8, there is explained, as an example, the case where the first portion 731a, the second portion 731b, and the third portion 731c are integrated and are not able to be separated. That is, in FIG. 8, for the convenience of notation and explanation, the boundary line between the first portion 731a and the third portion 731c and the boundary line between the second portion 731b and the third portion 731c are each illustrated by dashed lines (virtual lines). However, in reality, such boundary lines do not exist. That is, the base end surfaces of the first portion 731a and the second portion 731b and the inner peripheral surface of the third portion 731c are illustrated by the boundary lines (dashed lines) in FIG. 8.

As above, the first core 731 is obtained by reducing the thickness (length in the Z-axis direction) of the core 230 explained in the first embodiment.

The second core 732 can be fabricated by the same one as the first core 731. The second core 732 is fabricated by replacing the first core 731, the first portion 731a, the second portion 731b, and the third portion 731c with the second core 732, the first portion 732a, the second portion 732b, and the third portion 732c, respectively in the explanation of the first core 731. Therefore, the detailed explanation of the second core 732 is omitted here.

The first core 731 and the second core 732 are arranged with an interval provided therebetween in the Z-axis direction. The positions of the first core 731 and the second core 732 in the casting width direction (X-axis direction) and the casting thickness direction (Y-axis direction) are the same. That is, when the core 730 is viewed from the Z-axis direction so that the first core 731 is visible, the second core 732 is hidden behind the first core 731 and is not visible. When the core 730 is viewed from the Z-axis direction so that the second core 732 is visible, the first core 731 is hidden behind the second core 732 and is not visible similarly.

As illustrated in FIG. 9B, the interval in the Z-axis direction between the first core 731 and the second core 732 is set so that the region on the second circumference portion 722 side of the region of the first circumference portion 721 and the region on the first circumference portion 721 side of the region of the second circumference portion 722 are arranged in the region between the first core 731 and the second core 732.

The spacer 740 is made of a nonmagnetic and insulating material. Further, the spacer 740 is also made of a material that is strong enough not to be deformed when installed in the continuous casting facility. The spacer 740 is arranged in the region between the first core 731 and the second core 732, where the detection coil 720 is not arranged. As illustrated in FIG. 7, in this embodiment, there is explained, as an example, the case where the spacer 740 has the same planar shape as that of the third portions 731c and 732c of the first core 731 and the second core 732. Incidentally, although the spacer 740 is not visible in the cross-sectional view illustrated in FIG. 7, the planar shape of the spacer 740 is illustrated by dashed lines for the convenience of explanation. The spacer 740 is arranged in the region between the first core 731 and the second core 732 so as to overlap the third portions 731c and 732c of the first core 731 and the second core 732.

FIG. 10A to FIG. 10C are views each conceptually explaining one example of the measurement principle of the flow rate measurement part 700. FIG. 10A to FIG. 10C are views corresponding to FIG. 6A to FIG. 6C.

FIG. 10A is a view that explains the magnetic field H (magnetic flux) when molten steel (molten metal) is not present. In FIG. 10A, since no molten steel (molten metal) is present between the excitation coil 210 and the detection coil 720, the magnetic field H (magnetic flux Φ) generated from the excitation coil 210 is directed toward the detection coil 720 without being affected by the molten steel. In FIG.

10A, as in FIG. 6A, to simplify the explanation, it is assumed that the magnetic fields H (magnetic fluxes Φ) generated from the excitation coil 210 all travel straight in the casting thickness direction (Y-axis direction). The magnetic field H generated from the excitation coil 210 penetrates the detection coil 720. In this case, the magnetic fluxes penetrating the first circumference portion 721 and the second circumference portion 722 of the detection coil 720 at the same time are the same in direction, and the amounts of magnetic fluxes in the same direction are the same. Therefore, as described previously, the induced electromotive force is not generated at both ends of the detection coil 720 (namely, the induced electromotive force is 0 (zero)).

FIG. 10B is a view that explains the magnetic field H (magnetic flux Φ) when molten steel (molten metal) whose flow velocity is 0 (zero) is present. In FIG. 10B, since molten steel (molten metal) is present between the excitation coil 210 and the detection coil 720, the eddy current $I_e$ flows in the molten steel so as to cancel the magnetic field H according to Lenz's law. Therefore, the magnetic field H (magnetic flux Φ) reaching the detection coil 720 is smaller than that illustrated in FIG. 10A. In FIG. 10B as well, this is represented by illustrating the arrow lines that indicate the magnetic field H (magnetic flux Φ) as dashed lines, as in FIG. 6B. In this case as well, the magnetic fluxes penetrating the first circumference portion 721 and the second circumference portion 722 at the same time are the same in direction, and the amounts of magnetic fluxes in the same direction are the same. Therefore, as described previously, the induced electromotive force is not generated at both ends of the detection coil 720 (namely, the induced electromotive force is 0 (zero)).

FIG. 10C is a view that explains the magnetic field H (magnetic flux Φ) when molten steel (molten metal) flowing in the casting progress direction (direction of the white arrow line) is present. In the same manner as explained with reference to FIG. 6C, in FIG. 10C, as the eddy current $I_e$ is dragged in the flowing direction of molten steel (negative direction of the Z axis), the magnetic field H (magnetic flux Φ) is also dragged in the flowing direction of molten steel (negative direction of the Z axis).

Here, the induced electromotive force V generated at both ends of the detection coil 720 is proportional to the time variation $(d(\varphi_1 - \varphi_2)/dt)$ in the difference between a magnetic flux $\varphi_1$ penetrating the first circumference portion 721 and a magnetic flux $\varphi_2$ penetrating the second circumference portion 722, and thus, when the proportional coefficient is set to a, the relationship of $V = \alpha\ d\Phi/dt = \alpha\ d\ (\varphi_1 - \varphi_2)/dt$ is established. Further, the deviation amount z between the eddy current $I_e$ and the magnetic field H (magnetic flux Φ) due to the flow of molten steel is in a proportional relationship with the flow velocity v of molten steel. Here, as has been explained in the first embodiment, the deviation amount z between the eddy current $I_e$ and the magnetic field H (magnetic flux) due to the flow of molten steel is the amount of deviation in the flowing direction of molten steel (negative direction of the Z axis). Therefore, the difference $(\varphi_1 - \varphi_2)$ between the amount of magnetic flux penetrating the first circumference portion 721 and the amount of magnetic flux penetrating the second circumference portion 722 is also in a proportional relationship with the flow velocity v of molten steel. Therefore, as illustrated in FIG. 10C, according to the deviation amount z between the eddy current $I_e$ and the magnetic field H (magnetic flux Φ) due to the flow of molten steel, the magnetic flux $\varphi_1$ penetrating the first circumference portion 721 decreases, and the magnetic flux $\varphi_2$ penetrating the second circumference portion 722 increases. As above, the deviation amount z between the eddy current $I_e$ and the magnetic field H (magnetic flux $\Phi$) due to the flow of molten steel and the difference ($\varphi_1$–$\varphi_2$) between the amount of magnetic flux penetrating the first circumference portion 721 and the amount of magnetic flux penetrating the second circumference portion 722 are in a proportional relationship. In FIG. 10C, this is represented by making the number of dashed arrow lines penetrating the first circumference portion 721 and the number of dashed arrow lines penetrating the second circumference portion 722 different from the number of dashed arrow lines illustrated in FIG. 10B. As described previously, the deviation amount z between the eddy current $I_e$ and the magnetic field H (magnetic flux $\Phi$) due to the flow of molten steel and the flow velocity v of molten steel are in a proportional relationship. Therefore, the difference ($\varphi_1$–$\varphi_2$) between the amount of magnetic flux penetrating the first circumference portion 721 and the amount of magnetic flux penetrating the second circumference portion 722 is also in a proportional relationship with the flow velocity v of molten steel ($\varphi_1$–$\varphi_2$ (=$\Phi$) can be approximated by a linear function of v). Therefore, the induced electromotive force V generated at both ends of the detection coil 720 is expressed as V=$\alpha$ d$\Phi$(v)/dt when the proportional coefficient is set to a.

The calculation unit 400 in this embodiment performs the same processing as the calculation unit 400 in the first embodiment. However, the signal to be input to the calculation unit 400 is not the induced electromotive force detected by the detection coil 220 but the induced electromotive force detected by the detection coil 720. The induced electromotive force detected by the detection coil 720 is an induced electromotive force that corresponds to the time variation in the difference ($\varphi_1$–$\varphi_2$) between the amount of magnetic flux penetrating the first circumference portion 721 and the amount of magnetic flux penetrating the second circumference portion 722. Therefore, the coefficients and constants of the function $\Phi$(v) and the value of the proportional coefficient $\alpha$ are different from those in the first embodiment. Further, even when penetrating the detection coil 720 in the absence of molten steel in the hollow portion of the surface-layer molten steel nozzle 160 (immersion nozzle 163), the induced electromotive force detected by the detection coil 720 is 0 (zero). Therefore, in this embodiment, it is no longer necessary to subtract the reference signal from the flow velocity source signal. Incidentally, as has been explained in the first embodiment, the reference signal is a flow velocity source signal obtained when the molten steel is not present in the hollow portion of the surface-layer molten steel nozzle 160 (immersion nozzle 163).

As above, in this embodiment, the detection coil 720 includes the first circumference portion 721 and the second circumference portion 722. Further, one turn of the detection coil 720 is made by the single first circumference portion 721 and the single second circumference portion 722 connected to the first circumference portion 721. The first circumference portion 721 and the second circumference portion 722 are connected so as to make the current flowing through the first circumference portion 721 and the current flowing through the second circumference portion 722 opposite in direction when the magnetic fluxes in the same direction penetrate the first circumference portion 721 and the second circumference portion 722 at the same time. Therefore, the induced electromotive force detected by the detection coil 720 corresponds to the induced electromotive force according to the time variation in the difference ($\varphi_1$–$\varphi_2$) between the amounts of magnetic flux penetrating the first circumference portion 721 and magnetic flux penetrating the second circumference portion 722. Therefore, in addition to the effect explained in the first embodiment, there is another effect that the induced electromotive force detected by the detection coil 720 is less susceptible to disturbance. Therefore, the flow rate of the molten steel flowing through the hollow portion of the surface-layer molten steel nozzle 160 (immersion nozzle 163) can be measured with even higher accuracy. Further, it is no longer necessary to perform the processing based on the flow velocity source signal when the molten steel is not present in the hollow portion of the surface-layer molten steel nozzle 160 (immersion nozzle 163).

Modified Examples

In this embodiment as well, the various modified examples explained in the first embodiment may be employed.

Third Embodiment

Next, the third embodiment is explained. In the first embodiment, there has been explained, as an example, the case where the core 230 is formed so as to go around the surface-layer molten steel nozzle 160 (immersion nozzle 163). That is, in the first embodiment, there has been explained, as an example, the case where the core 230 has a shape closed around the surface-layer molten steel nozzle 160 (immersion nozzle 163) in the X-Y cross section. When the embodiment is configured in this manner as has been explained in the first embodiment, it is possible to further reduce the influence of noise contained in the signal of the induced electromotive force, and to reduce the magnetic field H (magnetic flux $\phi$) leaking to the outside to inhibit any adverse effects on the outside. On the other hand, when the core 230 is formed so as to go around the surface-layer molten steel nozzle 160 (immersion nozzle 163), the volume of the core 230 increases. Further, it is not easy to evacuate the flow rate measurement part 200 and the surface-layer molten steel nozzle 160 (immersion nozzle 163) from the continuous casting facility. Thus, in this embodiment, there is explained, as an example, the case of using a core that does not go around the surface-layer molten steel nozzle 160 (immersion nozzle 163). That is, in this embodiment, there is explained the case of using a core that does not have the shape closed around the surface-layer molten steel nozzle 160 (immersion nozzle 163) in the X-Y cross section. As above, this embodiment differs from the first embodiment mainly in the configuration of the core. Therefore, in the explanation of this embodiment, the same components as those in the first embodiment are denoted by the same reference numerals and symbols as those illustrated in FIG. 1 to FIG. 6A to FIG. 6C, and detailed explanations thereof are omitted.

In this embodiment as well, there is explained, as an example, the case where a flow rate measurement system is applied to the continuous casting facility explained in the first embodiment. FIG. 11 is a view illustrating one example of a configuration of the flow rate measurement system. FIG. 11 is a view corresponding to FIG. 2. FIG. 12 is a view illustrating one example of details of arrangement of the flow rate measurement system. FIG. 12 is a view corresponding to FIG. 4.

In FIG. 11 to FIG. 12, the flow rate measurement system includes a flow rate measurement part 1100 and the calculation unit 400. In this embodiment as well, the flow rate of the molten steel in the hollow portion of the immersion nozzle 163 is set to an object to be measured, as in the first embodiment. However, similarly to the flow rate measurement system in the first embodiment, in the flow rate measurement system in this embodiment as well, the flow rate of the molten steel in the hollow portion of the upper nozzle 161 may be set to an object to be measured.

Further, in this embodiment as well, there is explained, as an example, the case where the position of the flow rate measurement part 1100 in the Z-axis direction is determined so that the range of the flow rate measurement part 1100 in the Z-axis direction (range from the top to the bottom) is included in the range of the immersion nozzle 163 in the Z-axis direction (range from the top to the bottom), as in the first embodiment (see FIG. 3).

The flow rate measurement part 1100 includes the excitation coil 210, the detection coil 220, a core 1130, and cases 1141 and 1142.

The excitation coil 210 and the detection coil 220 are the same as those explained in the first embodiment.

In this embodiment, as illustrated in FIG. 11 and FIG. 12, there is explained, as an example, the case where the core 1130 includes the first portion 1130a and the second portion 1130b. The first portion 1130a and the second portion 1130b have the same configuration. The first portion 1130a is the same as the first portion 230a explained in the first embodiment, for example, and has a rectangular parallelepiped shape. The excitation coil 210 goes around the first portion 1130a. Here, as illustrated in FIG. 11 and FIG. 12, the length of the first portion 1130a in the Y-axis direction does not need to be longer than the length of the excitation coil 210 in the Y-axis direction (that is, the length of the first portion 1130a in the Y-axis direction may be equal to or less than the length of the excitation coil 210 in the Y-axis direction). The second portion 1130b is the same as the second portion 230b explained in the first embodiment, for example, and has a rectangular parallelepiped shape. The detection coil 220 goes around the second portion 1130b. Here, as illustrated in FIG. 11 and FIG. 12, the length of the second portion 1130b in the Y-axis direction does not need to be longer than the length of the detection coil 220 in the Y-axis direction (that is, the length of the second portion 1130b in the Y-axis direction may be equal to or less than the length of the detection coil 220 in the Y-axis direction). In this embodiment, the core 1130 does not include the portion formed using a soft magnetic material to magnetically connect the first portion 1130a and the second portion 1130b, like the third portion 230c explained in the first embodiment.

The cases 1141 and 1142 are formed using a heat insulating material, similarly to the case 240 explained in the first embodiment. Further, the cases 1141 and 1142 are preferably formed using a nonmagnetic and nonmetallic (preferably insulating) material. In this embodiment, the individual cases 1141 and 1142 are used for the first portion 1130a and the second portion 1130b of the core 1130 respectively. The case 1141 is intended to prevent the excitation coil 210 and the first portion 1130a of the core 1130 from being overheated by radiant heat from molten steel. The excitation coil 210 and the first portion 1130a of the core 1130 are housed inside the case 1141. The case 1142 is intended to prevent the detection coil 220 and the second portion 1130b of the core 1130 from being overheated by radiant heat from molten steel. The detection coil 220 and the second portion 1130b of the core 1130 are housed inside the case 1142. Incidentally, the insides of the cases 1141 and 1142 do not communicate with each other.

Similarly to the case 240 explained in the first embodiment, a cooling medium (such as dry air) may be supplied from the outside of the case 1141 (1142) to the inside toward the excitation coil 210 and the first portion 1130a of the core 1130 (the detection coil 220 and the second portion 1130b of the core 1130).

As above, in this embodiment, the core 1130 includes the first portion 1130a where the excitation coil 210 is arranged and the second portion 1130b where the detection coil 220 is arranged, and does not go around (not surround) the surface-layer molten steel nozzle 160 (immersion nozzle 163). Therefore, various pieces of work for the excitation coil 210, the first portion 1130a of the core 1130, and the case 1141, and various pieces of work for the detection coil 220, the second portion 1130b of the core 1130, and the case 1142 can be executed separately. Incidentally, the various pieces of work include installation work, removal work, and so on. Further, the volume and mass of the flow rate measurement part 1100 can be reduced. Therefore, various pieces of work for the flow rate measurement part 1100 are facilitated. Further, the sizes of the cases 1141 and 1142 can also be reduced. Therefore, the stagnation of the cooling medium that occurs inside the cases 1141 and 1142, for example, is inhibited, thereby making it easier to cool the insides of the cases 1141 and 1142.

Further, in this embodiment, as illustrated in FIG. 11, a space larger than the outer diameter of the surface-layer molten steel nozzle 160 (immersion nozzle 163) is formed in the core 1130 and the cases 1141 and 1142 as a space for evacuating the flow rate measurement part 1100 and the surface-layer molten steel nozzle 160 (immersion nozzle 163) from the continuous casting facility. That is, at least one of the flow rate measurement part 1100 and the surface-layer molten steel nozzle 160 (immersion nozzle 163) is moved along a direction perpendicular to the Z-axis direction, and thereby a space larger than the outer diameter of the surface-layer molten steel nozzle 160 (immersion nozzle 163) is formed in the core 1130 and the cases 1141 and 1142 so as to prevent the flow rate measurement part 1100 and the surface-layer molten steel nozzle 160 (immersion nozzle 163) from overlapping when the flow rate measurement part 1100 and the surface-layer molten steel nozzle 160 (immersion nozzle 163) are viewed from the direction in which the first portion 1130a and the second portion 1130b of the core 1130 face each other (Y-axis direction). Incidentally, the outer diameter of the surface-layer molten steel nozzle 160 (immersion nozzle 163) is the outer diameter of the surface-layer molten steel nozzle 160 (diameter of the outermost circle) in the cross section illustrated in FIG. 11. Therefore, the flow rate measurement part 1100 and the surface-layer molten steel nozzle 160 (immersion nozzle 163) can be easily evacuated from the continuous casting facility. Further, the method of moving the flow rate measurement part 1100 and the surface-layer molten steel nozzle 160 (immersion nozzle 163) is not particularly limited. For example, the flow rate measurement part 1100 and/or the surface-layer molten steel nozzle 160 (immersion nozzle 163) may be moved using a crane. A drive device including a motor for moving the flow rate measurement part 1100 or a drive device including a motor for moving the surface-layer molten steel nozzle 160 (immersion nozzle 163) may be used.

MODIFIED EXAMPLES

First Modified Example

In this embodiment, there has been explained, as an example, the case where the core 1130 includes the first portion 1130a and the second portion 1130b each having a rectangular parallelepiped shape. However, the first portion and the second portion of the core are not limited to those illustrated in FIG. 11 and FIG. 12, as long as this embodiment has the configuration in which the core 1130 does not go around the surface-layer molten steel nozzle 160 (immersion nozzle 163). For example, the following first modified example may be employed.

Figure 13:
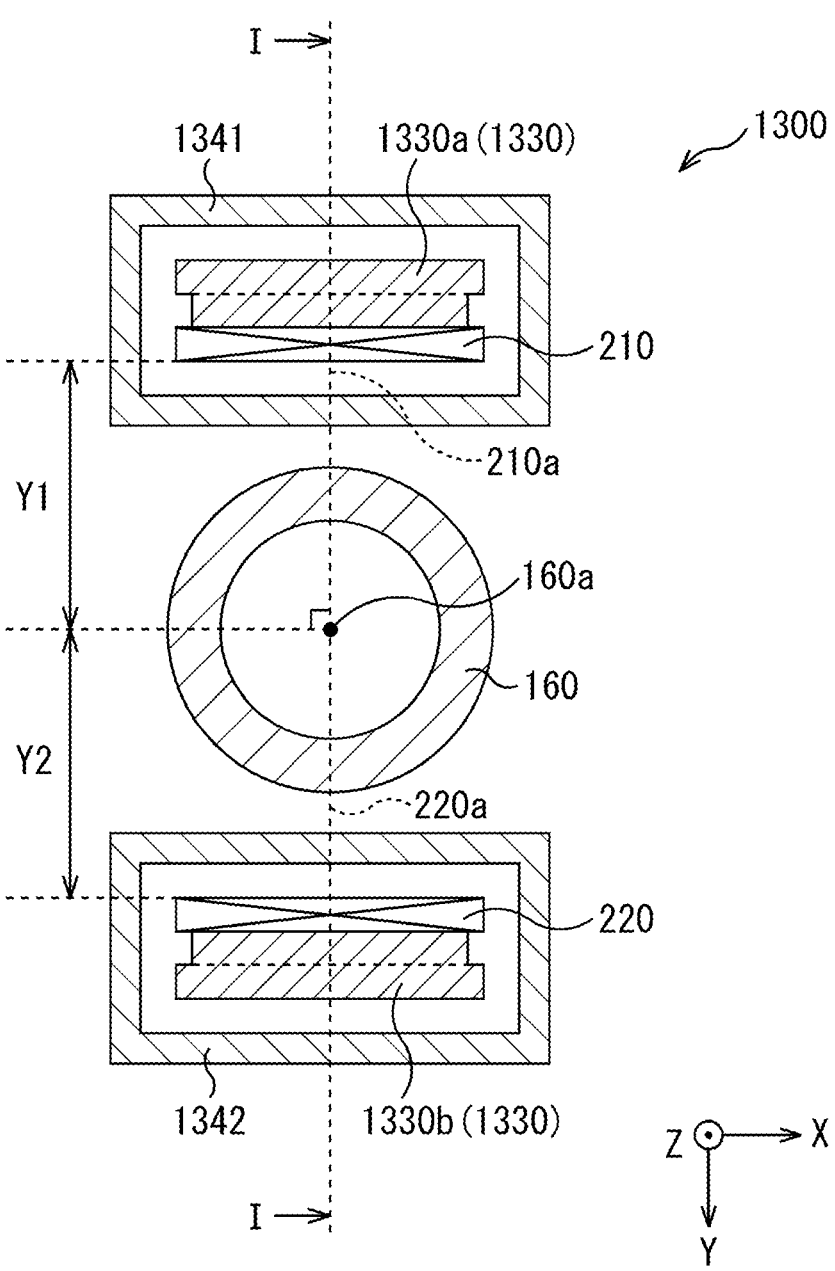
FIG. 13 is a view illustrating a configuration of a flow rate measurement system in a first modified example of the third embodiment.

FIG. 13 is a view illustrating a configuration of a flow rate measurement system in the first modified example of this embodiment. FIG. 13 is a view corresponding to FIG. 2 and FIG. 11. FIG. 14 is a view illustrating details of arrangement of the flow rate measurement system in the first modified example of this embodiment. FIG. 14 is a view corresponding to FIG. 4 and FIG. 12.

In FIG. 13 to FIG. 14, the flow rate measurement system includes a flow rate measurement part 1300 and the calculation unit 400.

The flow rate measurement part 1300 includes the excitation coil 210, the detection coil 220, a core 1330, and cases 1341 and 1342.

The excitation coil 210 and the detection coil 220 are the same as those explained in the first embodiment.

In the first modified example, as illustrated in FIG. 13 and FIG. 14, there is explained, as an example, the case where the core 1330 includes the first portion 1330a and the second portion 1330b. The first portion 1330a and the second portion 1330b have the same configuration. The first portion 1330a and the second portion 1330b each have a shape in which two rectangular parallelepipeds different in size are integrated so as to have a projecting shape in the X-Y cross section and the Y-Z cross section as illustrated in FIG. 13 and FIG. 14, for example. Incidentally, the X-Z cross sections of the first portion 1330a and the second portion 1330b are a quadrilateral, where the wider region of the projecting shape is larger than the narrower region. In FIG. 13 and FIG. 14, the boundary between the wider region and the narrower region of the projecting shape is indicated by dashed lines (a virtual line).

This allows the amount of magnetic flux generated by the excitation coil 210 to be further increased by the extent of the wider region of the projecting shape of the first portion 1330a and the second portion 1330b. Therefore, the measurement accuracy of the flow rate of the molten steel can be improved. Further, it is possible to inhibit the magnetic flux generated from the excitation coil 210 from spreading to the surroundings. Therefore, disturbances caused by electromagnetic induction can be reduced. Furthermore, the noise that the detection coil 220 receives from the surroundings can be weakened.

The excitation coil 210 goes around the narrower region of the projecting shape of the first portion 1330a. Here, it is preferable that the side surfaces (end surfaces in the X-axis direction and the Z-axis direction) of the wider region of the projecting shape of the first portion 1330a should not be located on the lateral sides (the positive-direction side and the negative-direction side of the X axis and the Z axis) relative to the excitation coil 210.

The detection coil 220 goes around the narrower region of the projecting shape of the second portion 1330b. Here, it is preferable that the side surfaces (end surfaces in the X-axis direction) of the wider region of the projecting shape of the second portion 1330b should not be located on the lateral sides (the positive-direction side and the negative-direction side of the X axis) relative to the detection coil 220.

Incidentally, in FIG. 13 and FIG. 14, for the convenience of notation and explanation, the boundary line between the narrower region and the wider region of the projecting shape of the first portion 1330a and the boundary line between the narrower region and the wider region of the projecting shape of the second portion 1330b are each indicated by dashed lines (virtual lines). However, in reality, such boundary lines do not exist.

Similarly to the core 1130 explained in this embodiment, the core 1330 in the first modified example also does not have a portion formed using a soft magnetic material for magnetically connecting the first portion 1330a and the second portion 1330b.

The cases 1341 and 1342 differ only in size from the cases 1141 and 1142 explained in this embodiment. The case 1341 has a size capable of housing the excitation coil 210 and the first portion 1330a of the core 1330. The case 1342 has a size capable of housing the detection coil 220 and the second portion 1330b of the core 1330.

When the core 1330 is configured as in the first modified example, the amount of magnetic flux to be generated from the excitation coil 210 (first portion 1330a of the core 1330) and the amount of magnetic flux that penetrates the detection coil 220 (second portion 1330b of the core 1330) can be increased compared to the core 1130 explained in this embodiment.

Further, the modified example of the core 1130 explained in this embodiment is not limited to the core 1330 in the first modified example.

For example, one of the following should be prioritized: inhibiting the increase in the volume and weight of the core, allowing the flow rate measurement part and the surface-layer molten steel nozzle 160 (immersion nozzle 163) to be easily evacuated from the continuous casting facility, and increasing the amount of magnetic flux, and thereby the shape and size of the core may be appropriately determined so as not to go around the surface-layer molten steel nozzle 160 (immersion nozzle 163).

Further, tip surfaces 1131a and 1331a of the first portions 1130a and 1330a of the cores 1130 and 1330 may be located on the side of the surface-layer molten steel nozzle 160 (immersion nozzle 163) (positive-direction side of the Y axis) relative to the excitation coil 210. Similarly, tip surfaces 1131b and 1331b of the first portions 1130b and 1330b of the cores 1130 and 1330 may be located on the side of the surface-layer molten steel nozzle 160 (immersion nozzle 163) (negative-direction side of the Y axis) relative to the detection coil 220. These are the same for the core 230 explained in the first embodiment and the core 730 explained in the second embodiment.

Second Modified Example

In this embodiment, there has been explained, as an example, the case of using the separate cases 1141 and 1142. However, the excitation coil 210, the detection coil 220, and the core 1130 (first portion 1130a and second portion 1130b) may be housed in one case so that the flow rate measurement part and the surface-layer molten steel nozzle 160 (immersion nozzle 163) can be easily evacuated from the continuous casting facility. For example, the following second modified example may be employed.

FIG. 15 is a view illustrating a configuration of a flow rate measurement system in the second modified example of this embodiment. FIG. 15 is a view corresponding to FIG. 2 and FIG. 11. FIG. 16 is a view illustrating details of arrangement of the flow rate measurement system in the second modified example of this embodiment. FIG. 16 is a view corresponding to FIG. 4 and FIG. 12. In FIG. 15 to FIG. 16, the flow rate measurement system includes a flow rate measurement part 1500 and the calculation unit 400.

The flow rate measurement part 1500 includes the excitation coil 210, the detection coil 220, the core 1130, and a case 1540.

The excitation coil 210 and the detection coil 220 are the same as those explained in the first embodiment. The core 1130 is the same as that explained in this embodiment.

The case 1540 is formed using a heat insulating material and is intended to prevent the excitation coil 210, the detection coil 220, and the core 1130 from being overheated by radiant heat from molten steel. The case 1540 is preferably formed using a nonmagnetic and nonmetallic (preferably insulating) material. Similarly to the core 230, the case 240 explained in the first embodiment has a shape that goes around (surrounds) the surface-layer molten steel nozzle 160 (immersion nozzle 163). That is, the case 240 explained in the first embodiment has a shape closed around the surface-layer molten steel nozzle 160 (immersion nozzle 163) in the X-Y cross section. The case 1540 in the second modified example is also arranged around the surface-layer molten steel nozzle 160 (immersion nozzle 163) similarly to the case 240 explained in the first embodiment. However, the case 1540 in the second modified example does not have the shape closed around the surface-layer molten steel nozzle 160 (immersion nozzle 163) in the X-Y cross section. Specifically, the case 1540 has a shape in which both ends are spaced apart in the X-Y cross section so as to allow the surface-layer molten steel nozzle 160 (immersion nozzle 163) to pass therethrough. More specifically, FIG. 15 illustrates the case where the case 1540 has a hollow recessed shape that is not open at both ends in the Z-axis direction in the shape of the X-Y cross section.

Inside the case 1540, the excitation coil 210, the detection coil 220, and the core 1130 (first portion 1130*a* and second portion 1130*b*) are housed. A cooling medium (such as dry air) may be supplied from the outside of the case 1540 to the inside toward the excitation coil 210, the detection coil 220, and the core 1130 (first portion 1130*a* and second portion 1130*b*). In this case, for example, a flow of the cooling medium circulating in a direction perpendicular to the Z-axis direction (flow circulating on the X-Y plane) may be formed inside the case 1540 (a hollow region) illustrated in FIG. 15. For example, one or more through holes may be formed in a partial region of the side surface of the case 1540 that is located in a narrower region of the recessed shape (for example, a tip surface). In this case, a pipe serving as a path for the cooling medium is attached to the through hole/through holes. Further, a fan or blower is attached to the pipe. In this case, the flow of the cooling medium circulating in a direction perpendicular to the Z-axis direction is formed inside the case 1540 (a hollow region) illustrated in FIG. 15.

The surface-layer molten steel nozzle 160 (immersion nozzle 163) is arranged in a recessed space of the recessed shape of the case 1540. The size of the space is large enough to allow the surface-layer molten steel nozzle 160 to be moved laterally (in the negative direction of the X axis) from the flow rate measurement part 1500. In this case, even with the single case 1540, the flow rate measurement part 1500 and the surface-layer molten steel nozzle 160 (immersion nozzle 163) can be easily evacuated from the continuous casting facility. Further, since the number of cases 1540 is one, it is no longer necessary to individually supply a cooling medium to each of the two cases 1141 and 1142 as in this embodiment.

Other Modified Examples

Incidentally, the first modified example and the second modified example may be combined. In addition, the various modified examples explained in the first embodiment may also be employed in this embodiment (except for the seventh modified example of the first embodiment). Further, the case 1540 explained in the second modified example of this embodiment may be applied to the core explained in the seventh modified example of the first embodiment.

Fourth Embodiment

Next, the fourth embodiment is explained. In the third embodiment, there has been explained, as an example, the case of applying the core 1130 having a shape that does not go around the surface-layer molten steel nozzle 160 (immersion nozzle 163) to the excitation coil 210 and the detection coil 220 explained in the first embodiment. That is, in the third embodiment, there has been explained, as an example, the case of applying, to the excitation coil 210 and the detection coil 220 explained in the first embodiment, the core 1130 that does not have the shape closed around the surface-layer molten steel nozzle 160 (immersion nozzle 163) in the X-Y cross section. In contrast to this, in this embodiment, there is explained the case of applying a core having a shape that does not go around the surface-layer molten steel nozzle 160 (immersion nozzle 163) to the excitation coil 210 and the detection coil 720 explained in the second embodiment. That is, in this embodiment, there is explained the case of applying, to the excitation coil 210 and the detection coil 720 explained in the second embodiment, a core that does not have the shape closed around the surface-layer molten steel nozzle 160 (immersion nozzle 163) in the X-Y cross section. As above, this embodiment differs from the third embodiment mainly in the configuration of the core. Therefore, in the explanation of this embodiment, the same components as those in the first to third embodiments are denoted by the same reference numerals and symbols as those in FIG. 1 to FIG. 16, and detailed explanations thereof are omitted.

There is explained, as an example, the case where a flow rate measurement system is applied to the continuous casting facility explained in the first embodiment, in this embodiment as well. FIG. 17 is a view illustrating one example of a configuration of the flow rate measurement system. FIG. 17 is a view corresponding to FIG. 2 and FIG. 7. FIG. 18 is a view illustrating one example of details of arrangement of the flow rate measurement system. FIG. 18 is a view corresponding to FIG. 4 and FIG. 8.

In FIG. 17 to FIG. 18, the flow rate measurement system includes a flow rate measurement part 1700 and the calculation unit 400. As in the first and second embodiments, the flow rate of the molten steel in the hollow portion of the immersion nozzle 163 is set to an object to be measured also in this embodiment. However, in the flow rate measurement system of this embodiment as well, the flow rate of the molten steel in the hollow portion of the upper nozzle 161 may be set to an object to be measured, similarly to the flow rate measurement systems in the first and second embodiments.

Further, in this embodiment as well, there is explained, as an example, the case where the position of the flow rate measurement part 1700 in the Z-axis direction is determined so that the range of the flow rate measurement part 1700 in the Z-axis direction (range from the top to the bottom) is included in the range of the immersion nozzle 163 in the Z-axis direction (range from the top to the bottom) as in the first and second embodiments (see FIG. 3).

The flow rate measurement part 1700 includes the excitation coil 210, the detection coil 720, a core 1730, a spacer 1740, and cases 1741 and 1742.

The excitation coil 210 and the detection coil 720 are the same as those explained in the first and second embodiments.

In this embodiment, as illustrated in FIG. 17 and FIG. 18, there is explained, as an example, the case where the core 1730 includes the first portion 1730*a* and two second portions 1730*b* and 1730*c*. The first portion 1730*a* is the same as the first portion 230*a* explained in the first embodiment, for example, and has a rectangular parallelepiped shape. The excitation coil 210 goes around the first portion 1730*a*. The two second portions 1730*b* and 1730*c* have the same configuration. The second portions 1730*b* and 1730*c* are the same as, for example, the second portion 731*a* of the first core 731 and the second portion 731*b* of the second core 732 explained in the second embodiment, respectively, and have a rectangular parallelepiped shape. The detection coil 720 goes around each of the second portions 1730*b* and 1730*c*.

The two second portions 1730*b* and 1730*c* of the core 1730 are arranged with an interval provided therebetween in the Z-axis direction. The positions of the two second portions 1730*b* and 1730*c* of the core 1730 in the casting width direction (X-axis direction) and the casting thickness direction (Y-axis direction) are the same. That is, when the core 1730 is viewed from the Z-axis direction so that one second portion 1730*b* of the core 1730 is visible, the other second portion 1730*c* of the core 1730 is hidden behind one second portion 1730*b* and is not visible.

Figures 19A, 19B:
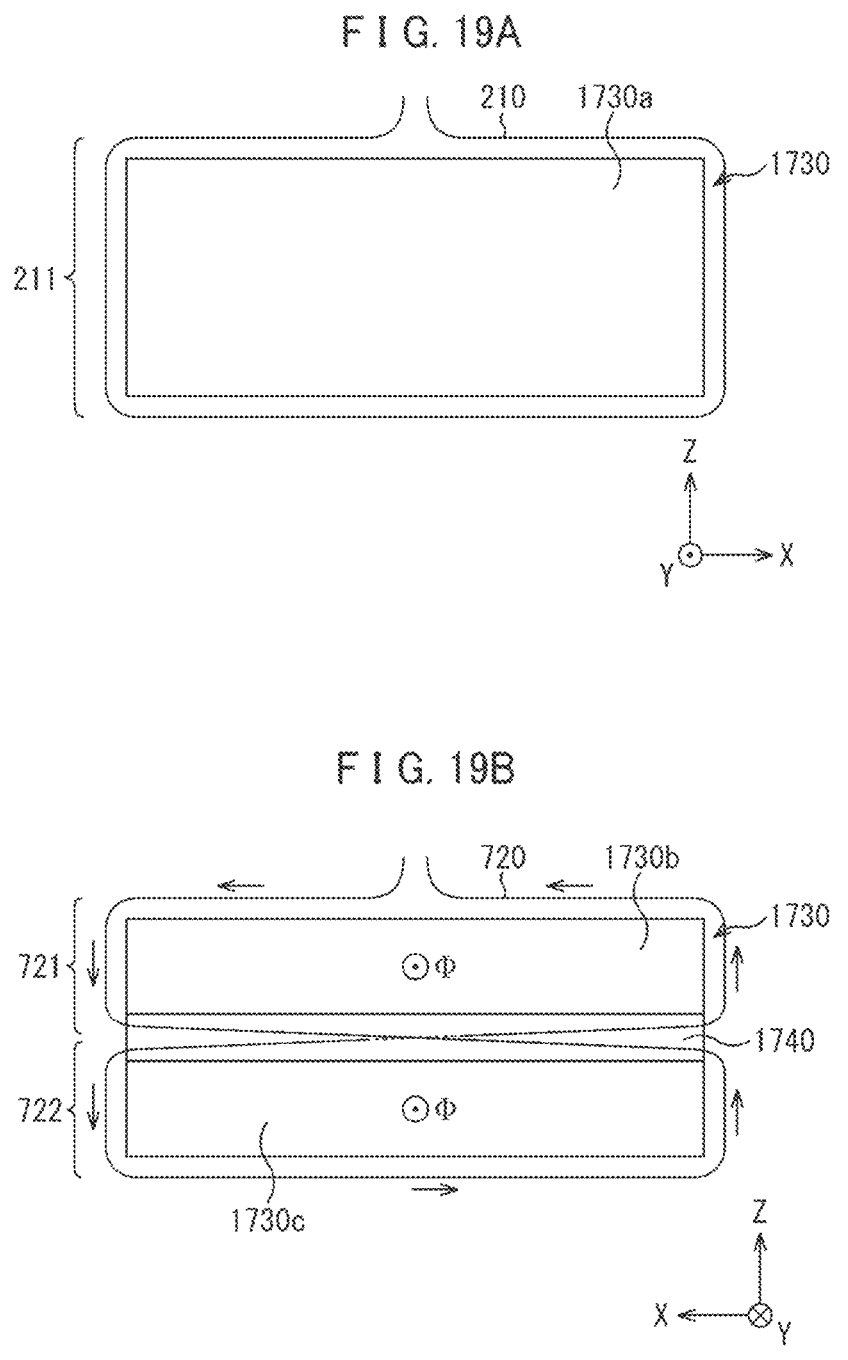

FIG. 19A is a view conceptually illustrating one example of the excitation coil 210 arranged so as to go around the core 1730. FIG. 19B is a view conceptually illustrating one example of the detection coil 720 arranged so as to go around the core 1730. FIG. 19A to FIG. 19B are views corresponding to FIG. 9A to FIG. 9B.

In this embodiment, as illustrated in FIG. 19A, there is explained, as an example, the case where the excitation coil 210 goes around the first portion 1730*a* of the core 1730. Further, as illustrated in FIG. 19A, in this embodiment as well, there is explained, as an example, the case where the excitation coil 210 includes at least the single circumference portion 211, as in the second embodiment. Further, in this embodiment as well, there is explained, as an example, the case where one turn of the excitation coil 210 is made by the single circumference portion 211, as in the second embodiment.

Further, as has been explained in the second embodiment, the detection coil 720 includes at least the single first circumference portion 721 and at least the single second circumference portion 722. One turn of the detection coil 720 is made by the single first circumference portion 721 and the single second circumference portion 722 connected to the first circumference portion 721. As illustrated in FIG. 19B, in this embodiment as well, there is explained, as an example, the case where the number of turns of the detection coil 720 is one, as in the second embodiment. However, the number of turns of the detection coil 720 is appropriately set so that the magnetic field generated by the excitation coil 210 is detected by the detection coil 720. The one-turn portion of the detection coil 720 has, as a whole, a shape obtained by twisting the one-turn portion of the detection coil 220 in the first embodiment into an 8-shape of Arabic numeral.

The magnetic fluxes penetrating the first circumference portion 721 and the second circumference portion 722 and the currents flowing through the first circumference portion 721 and the second circumference portion 722 are as explained in the second embodiment with reference to FIG. 9A and FIG. 9B. Therefore, their detailed explanations are omitted here.

As illustrated in FIG. 19B, the interval in the Z-axis direction between the two second portions 1730*b* and 1730*c* of the core 1730 is set so that the region on the second circumference portion 722 side of the region of the first circumference portion 721 and the region on the first circumference portion 721 side of the region of the second circumference portion 722 are arranged in the region between the two second portions 1730*b* and 1730*c* of the core 1730.

The spacer 1740 is formed of a nonmagnetic and insulating material, similarly to the spacer 740 explained in the second embodiment. Further, the spacer 1740 is formed of a material that is strong enough not to be deformed when installed in the continuous casting facility. The spacer 1740 is arranged in the region between the two second portions 1730*b* and 1730*c* of the core 1730, where the detection coil 720 is not arranged. As illustrated in FIG. 17, in this embodiment, there is explained, as an example, the case where the spacer 1740 has a rectangular parallelepiped shape. Incidentally, although the spacer 1740 is not visible in the cross-sectional view illustrated in FIG. 17, the planar shape of the spacer 1740 is illustrated by dashed lines for the convenience of explanation. The spacer 1740 is arranged in the region between the two second portions 1730*b* and 1730*c* of the core 1730 so as to overlap with the region of the two second portions 1730*b* and 1730*c* where the detection coil 720 is not arranged.

In the second embodiment, the core 730 having a shape that goes around the surface-layer molten steel nozzle 160 (immersion nozzle 163) is used. That is, in the second embodiment, the core 730 having the shape that is closed around the surface-layer molten steel nozzle 160 (immersion nozzle 163) in the X-Y cross section is used. Then, in the second embodiment, there has been explained, as an example, the case where the core 730 includes the first core 731 arranged relatively upstream (on the upper side) in the casting direction (Z-axis direction) and the second core 732 arranged relatively downstream (on the lower side) in the casting direction (Z-axis direction), as illustrated in FIG. 7 to FIG. 9A and FIG. 9B. These first core 731 and second core 732 have a shape closed around the surface-layer molten steel nozzle 160 (immersion nozzle 163) in the X-Y cross section. Further, the spacer 740 also has a shape closed around the surface-layer molten steel nozzle 160 (immersion nozzle 163) in the X-Y cross section. In the second embodiment, the core 730 having such a shape and the spacer 740 having such a shape are used. Therefore, in order to arrange the detection coil 720, the spacer 740 is arranged between the first core 731 and the second core 732 also in the region where the excitation coil 210 is arranged.

In contrast to this, in the present embodiment, the core 1730 does not have a portion for magnetically connecting the first portion 1730*a* to the second portions 1730*b* and 1730*c*. Therefore, it is no longer necessary to make the first portion 1730*a* of the core 1730 into two first portions separated in the Z-axis direction, like the first portions 731*a* and 732*a* of the first core 731 and the second core 732 explained in the second embodiment. Therefore, the amount of magnetic flux generated from the first portion 1730*a* of the core 1730 can be made larger than the amount of magnetic flux generated from the first portions 731*a* and 732*a* of the first core 731 and the second core 732.

Modified Example

In this embodiment as well, the various modified examples explained in the first to third embodiments may be employed (except for the seventh modified example of the first embodiment). Further, in the second embodiment as well, as in this embodiment, at least a part of the region between the first core 731 and the second core 732 other than the region where the excitation coil 210 and the detection coil 720 are arranged may be set as a partial region of the core (namely, it may be formed of a soft magnetic material).

Example

Next, there are explained examples.

In this example, the flow rate of the molten steel flowing through the hollow portion of the surface-layer molten steel nozzle 160 (immersion nozzle 163) was measured using the method in the second embodiment.

FIG. 20 is a view illustrating one example of the relationship between the flow rate of molten steel and the induced electromotive force. Incidentally, in each graph, a. u. indicates an arbitrary unit.

To obtain graphs 2001 and 2002 illustrated in FIG. 20, the flow rate of the molten steel was derived based on the induced electromotive force detected by the detection coil 720 in two different periods, and the relationship between the flow rate of the molten steel and the induced electromotive force was derived for each period. In FIG. 20, the graph 2001 indicates the relationship in the first period, and the graph 2002 indicates the relationship in the second period. The end of the first period is earlier than the beginning of the second period, and there is no overlap between the first and second periods. The slopes of the graphs 2001 and 2002 are approximately the same. This reveals that with the method in the second embodiment, accurate measurements can be continuously performed even if the time of radiant heat exposure from molten steel is long.

FIG. 21A to FIG. 21B each are a view illustrating one example of the relationship between the velocity and the induced electromotive force. FIG. 21A illustrates the relationship in the case of using the method described in Patent Literature 2. FIG. 21B illustrates the relationship in the case of using the method in the second embodiment. To obtain graphs 2111 to 2113, 2121, 2122, and 2123 illustrated in FIG. 21A and FIG. 21B, by using solid metal instead of molten steel, the induced electromotive force was detected while varying the velocity of the metal, and the relationship between the velocity and the induced electromotive force was derived from the detected results. The derivation of the relationship between the velocity and the induced electromotive force was performed while varying the distance between the detection coil and the metal.

As illustrated in the graphs 2111, 2112, and 2113 in FIG. 21A, the relationship between the velocity and the induced electromotive force varies when the distance between the detection coil and the metal varies in the method described in Patent Literature 2. This corresponds to the fact that when the molten steel is flowing discretely in the space without the space being filled therewith, the induced electromotive force detected by the detection coil exhibits different values depending on the location where the molten steel is present, even with the same flow rate. In contrast to this, as illustrated in the graphs 2121, 2122, and 2123 in FIG. 21B, in the method in the second embodiment, the relationship between the velocity and the induced electromotive force hardly varies even when the distance between the detection coil and the metal varies. This corresponds to the fact that even when the molten steel is flowing discretely in the space without the space being filled therewith, the induced electromotive force detected by the detection coil is hardly dependent on the location of the molten steel. Therefore, it reveals that the method in the second embodiment can measure the flow rate of the molten steel flowing through the hollow portion of the surface-layer molten steel nozzle 160 (immersion nozzle 163) with higher accuracy than the method described in Patent Literature 2.

(Hardware of the Computer 404)

There is explained one example of the hardware of the computer 404. In FIG. 22, the computer 404 includes a CPU 2201, a main memory 2202, an auxiliary memory 2203, a communication circuit 2204, a signal processing circuit 2205, an image processing circuit 2206, an I/F circuit 2207, a user interface 2208, a display 2209, and a bus 2210.

The CPU 2201 overall controls the entire computer 404. The CPU 2201 uses the main memory 2202 as a work area to execute a program stored in the auxiliary memory 2203. The main memory 2202 stores data temporarily. The auxiliary memory 2203 stores various data, in addition to programs to be executed by the CPU 2201.

The communication circuit 2204 is a circuit intended for performing communication with the outside of the computer 404. The communication circuit 2204 may perform radio communication or wire communication with the outside of the computer 404.

The signal processing circuit 2205 performs various pieces of signal processing on signals received in the communication circuit 2204 and signals input according to the control by the CPU 2201.

The image processing circuit 2206 performs various pieces of image processing on signals input according to the control by the CPU 2201. The signal that has been subjected to the image processing is output on the display 2209, for example.

The user interface 2208 is a part in which an operator gives an instruction to the computer 404. The user interface 2208 includes buttons, switches, dials, and so on, for example. Further, the user interface 2208 may include a graphical user interface using the display 2209.

The display 2209 displays an image based on a signal output from the image processing circuit 2206. The I/F circuit 2207 exchanges data with a device connected to the I/F circuit 2207. In FIG. 22, as the device to be connected to the I/F circuit 2207, the user interface 2208 and the display 2209 are illustrated. However, the device to be connected to the I/F circuit 2207 is not limited to these. For example, a portable storage medium may be connected to the I/F circuit 2207. Further, at least a part of the user interface 2208 and the display 2209 may be provided outside the computer 404.

Incidentally, the CPU 2201, the main memory 2202, the auxiliary memory 2203, the signal processing circuit 2205, the image processing circuit 2206, and the I/F circuit 2207 are connected to the bus 2210. Communication among these components is performed via the bus 2210. Further, the hardware of the computer 404 is not limited to the one illustrated in FIG. 22 as long as it can perform the previously-described functions of the computer 404.

Other Embodiments

Incidentally, pieces of the processing performed by the computer 404 in the embodiments of the present disclosure explained above can be implemented by causing a computer to execute a program. Further, a computer-readable recording medium in which the aforementioned program is recorded and a computer program product such as the aforementioned program can also be applied as the embodiment of the present disclosure. As the recording medium, it is possible to use a flexible disk, a hard disk, an optical disk, a magneto-optic disk, a CD-ROM, a magnetic tape, a nonvolatile memory card, a ROM, or the like, for example.

Further, the embodiments of the present disclosure explained above merely illustrates concrete examples of implementing the present disclosure, and the technical scope of the present disclosure is not to be construed in a restrictive manner by the embodiment. That is, the present disclosure may be implemented in various forms without departing from the technical spirit or main features thereof.

INDUSTRIAL APPLICABILITY

The present disclosure can be utilized for measuring the flow rate of molten metal flowing through a hollow portion of a pipe, for example.

The invention claimed is:

1. A flow rate measurement system being a flow rate measurement system that measures a flow rate of molten metal flowing through a hollow portion of a pipe, the flow rate measurement system comprising:

an excitation coil that generates a magnetic field so as to intersect with the molten metal flowing through the hollow portion of the pipe;

current supply processor circuitry that supplies an alternating exciting current to the excitation coil;

a detector that detects a signal based on a magnetic field generated from the excitation coil by an alternating exciting current flowing through the excitation coil or a time variation in the magnetic field; and flow rate deriving processor circuitry that derives the flow rate of the molten metal based on the signal detected by the detector, wherein the pipe is arranged between the excitation coil and the detector, and a magnetic field generated by the excitation coil, the magnetic field crossing the pipe and reaching the detector that is disposed to face the excitation coil, with the pipe interposed therebetween.

2. The flow rate measurement system according to claim 1, wherein the detector includes a detection coil, the flow rate deriving processor circuitry derives the flow rate of the molten metal based on a signal of an induced electromotive force generated at the detection coil by the detection coil detecting a time variation in a magnetic field, and a magnetic flux based on the magnetic field generated from the excitation coil crosses the pipe and penetrates the detection coil, and thereby the induced electromotive force is generated at the detection coil.

3. The flow rate measurement system according to claim 2, further comprising:

a core formed using a soft magnetic material, wherein the excitation coil and the detection coil are arranged so as to go around the core.

4. The flow rate measurement system according to claim 3, wherein the core includes:

a first portion where the excitation coil is arranged;

a second portion where the detection coil is arranged; and a third portion magnetically connected to the first portion and the second portion and arranged so as to go around the core, and the first portion and the second portion are arranged at positions facing each other with the pipe located therebetween and an interval provided therebetween.

5. The flow rate measurement system according to claim 3, wherein the core includes:

a first portion where the excitation coil is arranged; and a second portion where the detection coil is arranged, the first portion and the second portion are arranged at positions facing each other with the pipe located therebetween and an interval provided therebetween, and the core does not go around the pipe.

6. The flow rate measurement system according to claim 5, wherein at least one of the core and the pipe is moved along a direction perpendicular to a longitudinal direction of the pipe, and thereby a space larger than an outer diameter of the pipe is formed in the core so as to prevent the core and the pipe from overlapping when the core and the pipe are viewed from the direction in which the first portion and the second portion face each other.

7. The flow rate measurement system according to claim 3, wherein the soft magnetic material is magnetized and demagnetized by the alternating exciting current.

8. The flow rate measurement system according to claim 2, wherein the detection coil includes at least one circumference portion, and one turn of the detection coil is made by one of the at least one circumference portion.

9. The flow rate measurement system according to claim 2, wherein the detection coil includes at least one first circumference portion and at least one second circumference portion, the at least one first circumference portion and the at least one second circumference portion are connected so as to make current flowing through the at least one first circumference portion and current flowing through the at least one second circumference portion opposite in direction when magnetic fluxes in the same direction penetrate the at least one first circumference portion and the at least one second circumference portion at the same time, and one turn of the detection coil is made by one of the at least one first circumference portion and one of the at least one second circumference portion connected to the first circumference portion.

10. The flow rate measurement system according to claim 1, wherein the molten metal is molten steel, and the pipe is a nozzle configured for supplying molten steel in a tundish into a mold in a continuous casting facility.

* * * * *